Jan. 14, 1941.    A. ALLEN    2,228,902
AUTOMATICALLY CONTROLLED MACHINE TOOL AND FOLLOW-UP SYSTEM
Filed May 4, 1932    10 Sheets—Sheet 6

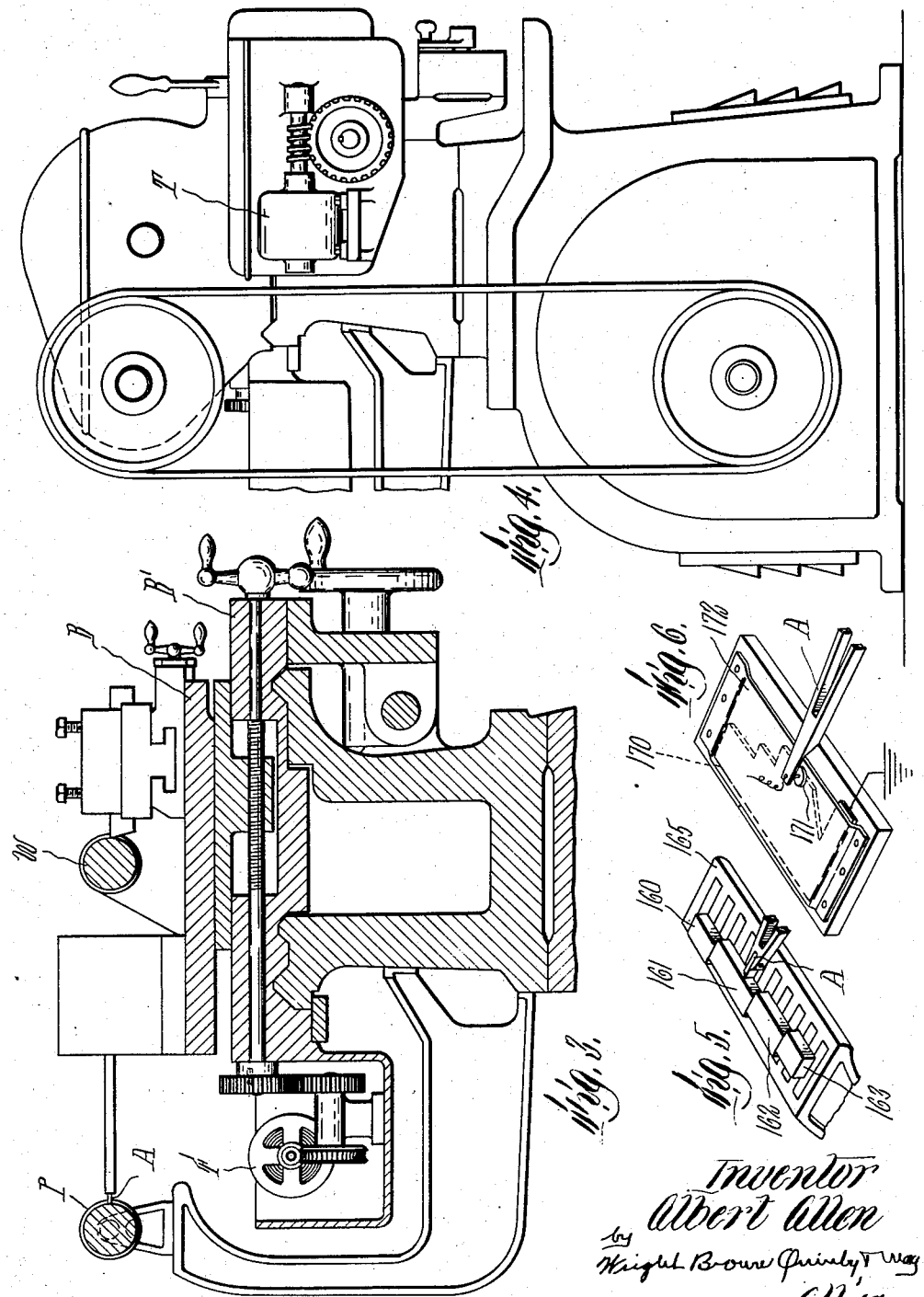

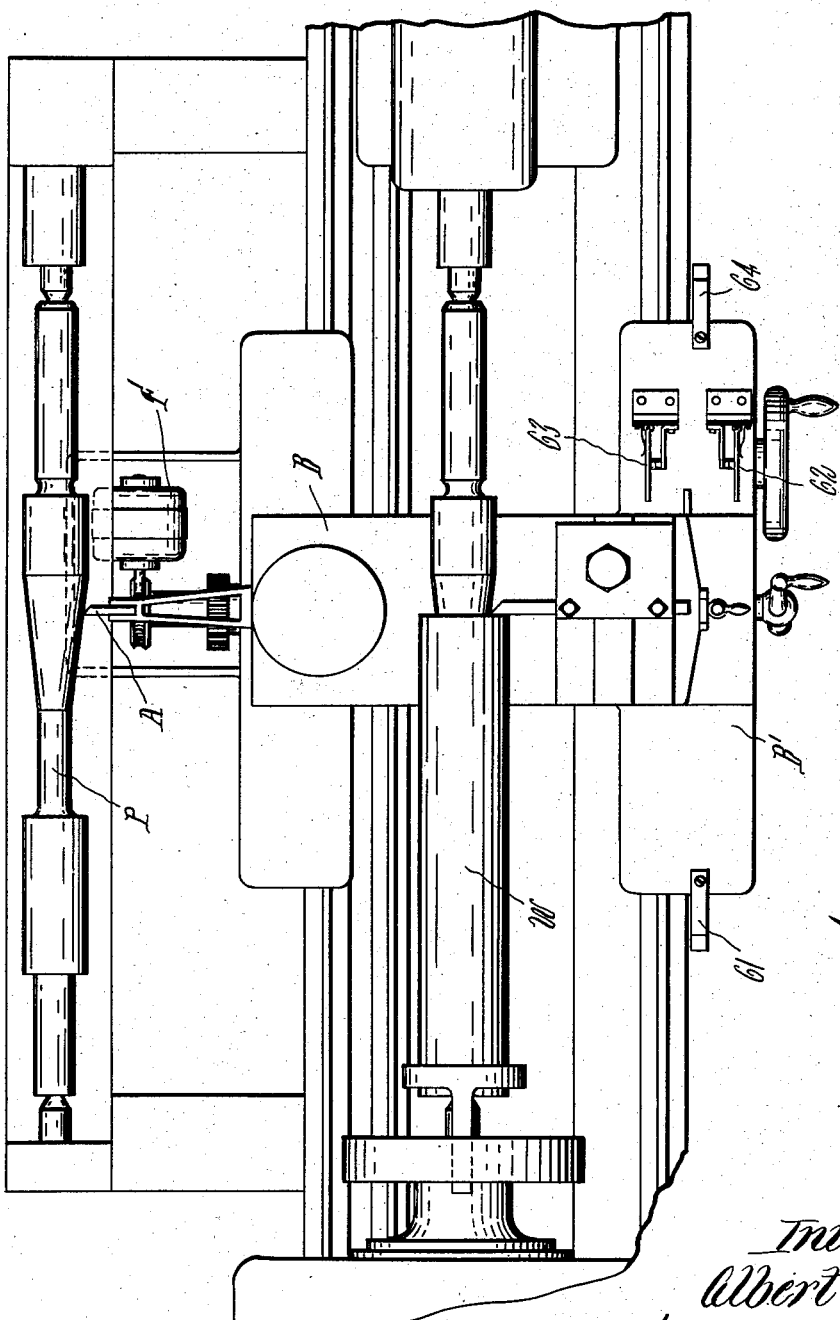

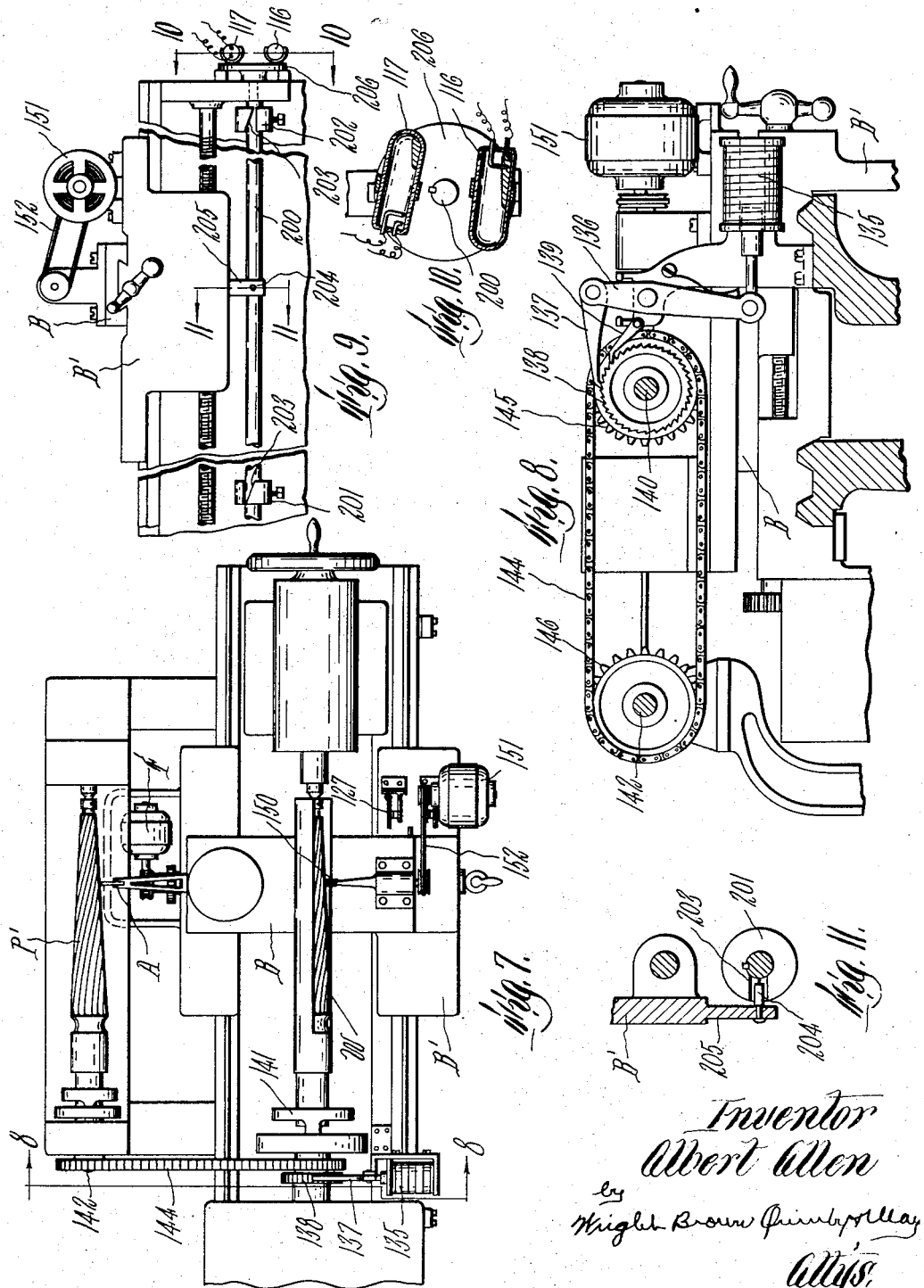

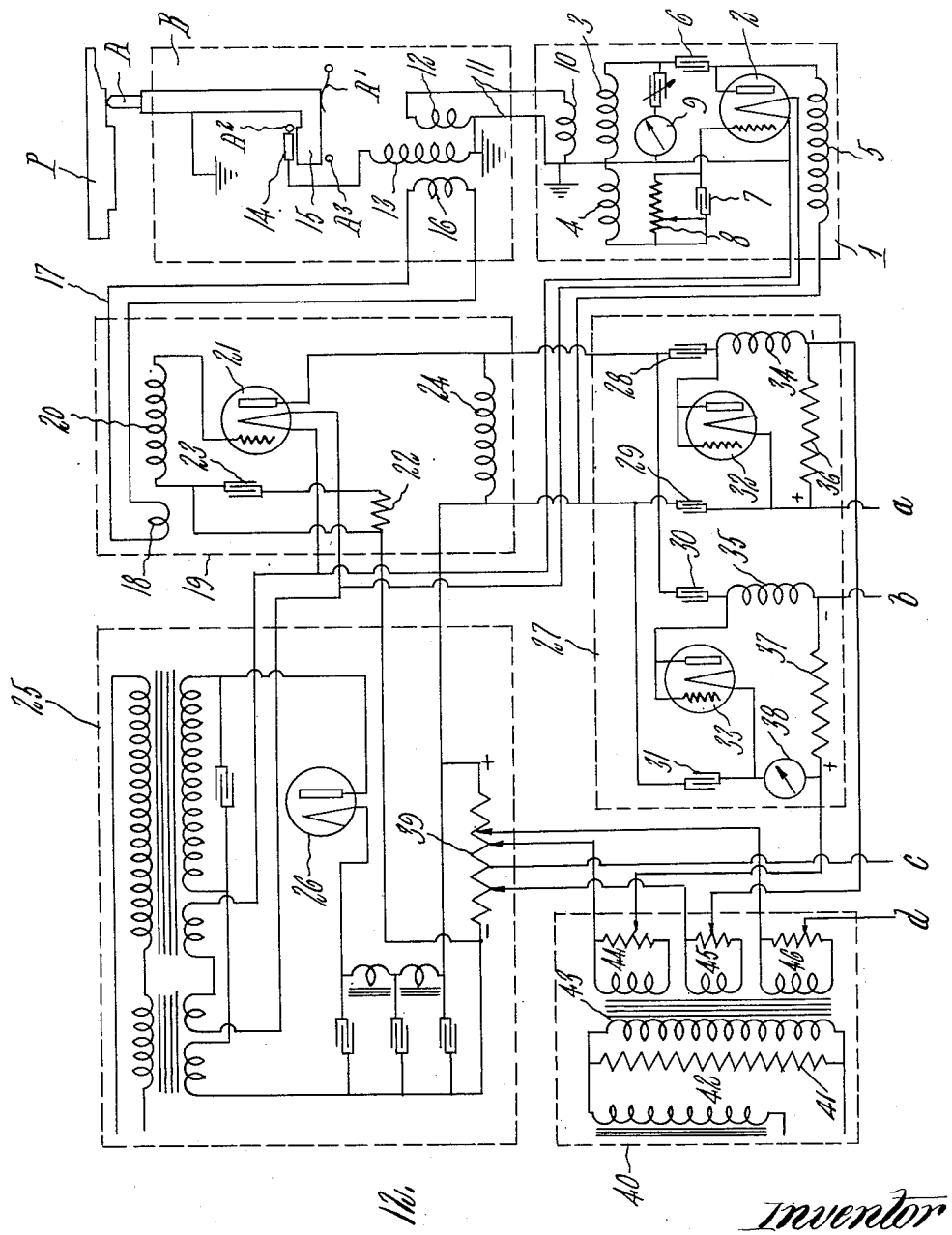

Inventor
Albert Allen
by Wright, Brown, Quinby & May
Attys.

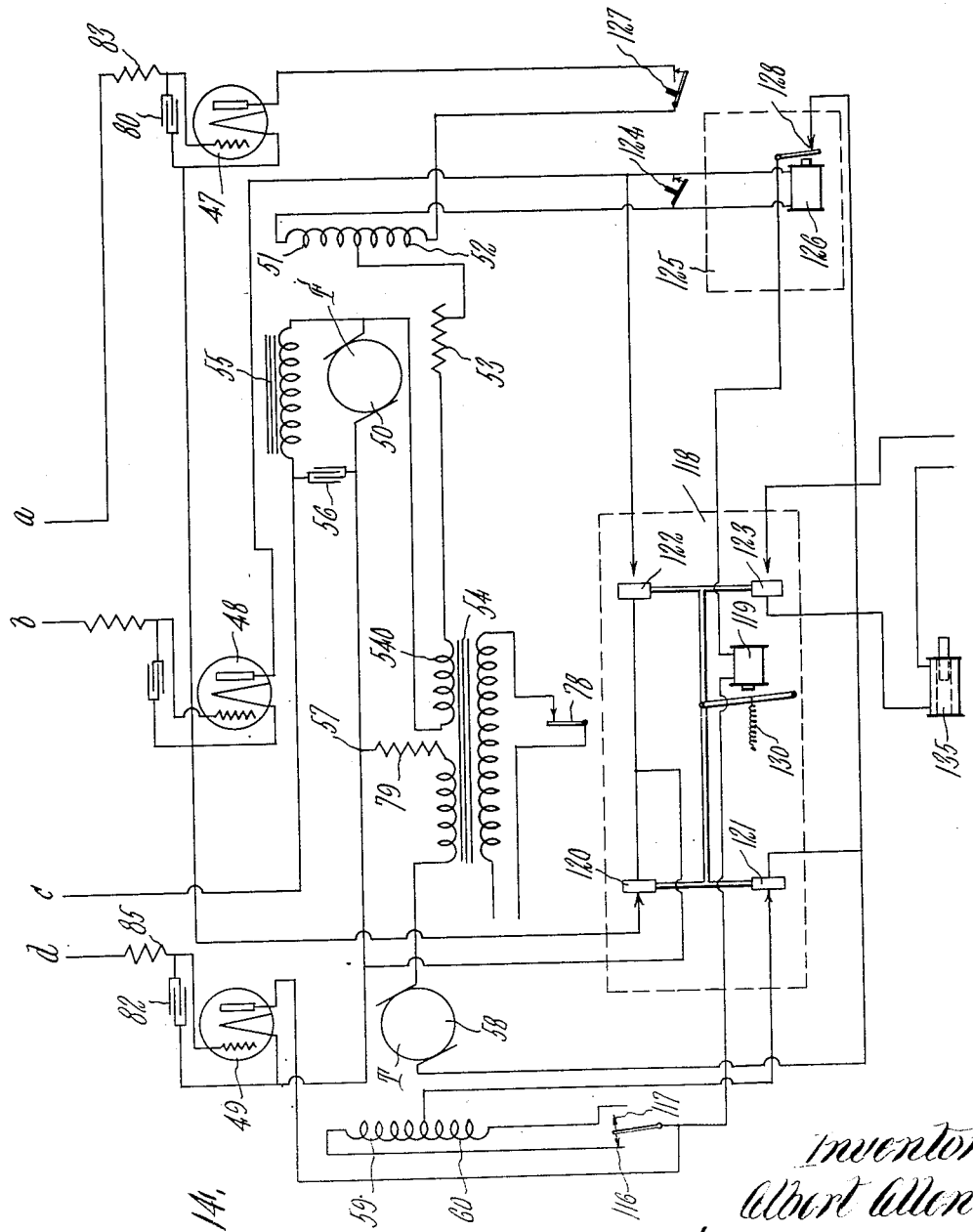

Jan. 14, 1941.  A. ALLEN  2,228,902
AUTOMATICALLY CONTROLLED MACHINE TOOL AND FOLLOW-UP SYSTEM
Filed May 4, 1932  10 Sheets—Sheet 10
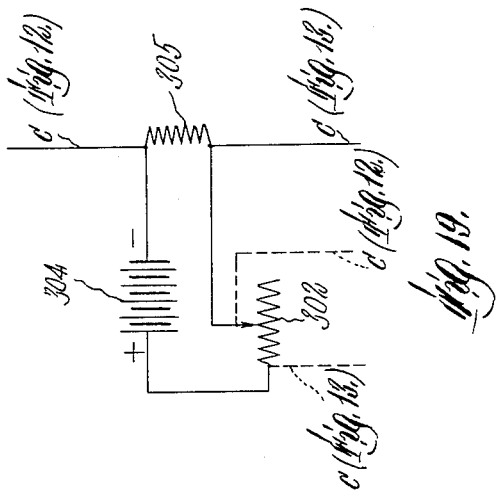
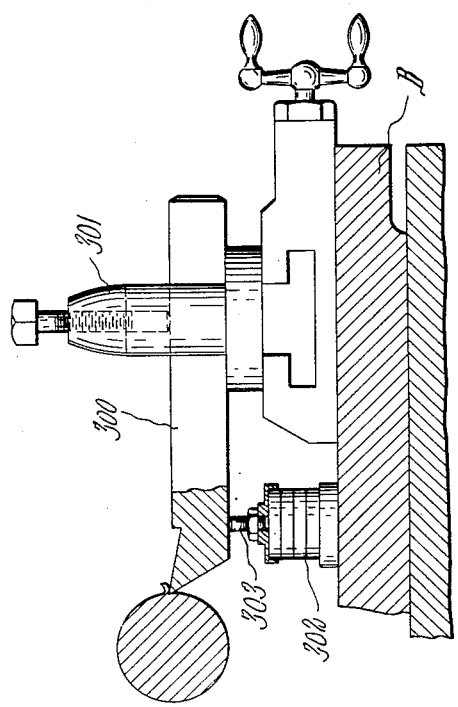
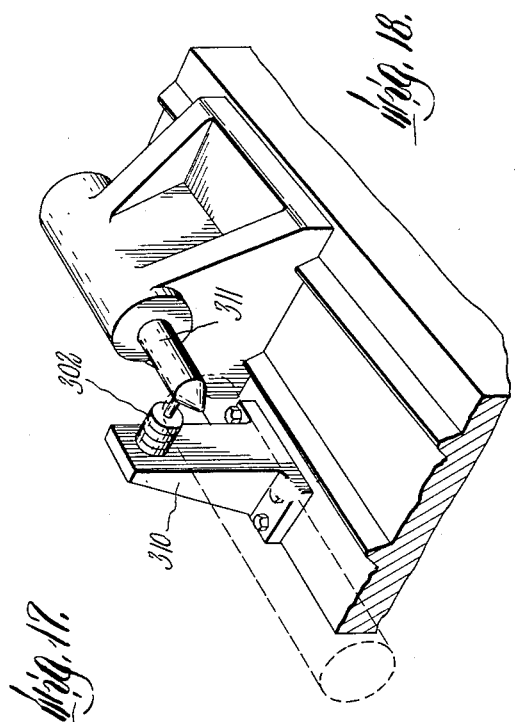
Inventor
Albert Allen
by Wright Brown Quinby & May
Attys.

Patented Jan. 14, 1941

2,228,902

UNITED STATES PATENT OFFICE

2,228,902

AUTOMATICALLY CONTROLLED MACHINE TOOL AND FOLLOW-UP SYSTEM

Albert Allen, Winchester, Mass., assignor, by mesne assignments, to The Foxboro Company, Foxborough, Mass., a corporation of Massachusetts Application May 4, 1932, Serial No. 609,139

75 Claims. (Cl. 82—14)

This invention relates to a follow-up system for automatically controlling the motion of one member from another, as, for example, cutting tools or the motion of work with relation to fixed cutting tools, applicable, for example, to lathes, die sinkers, milling machines, grinders, routers, etc., for the purpose of reproducing on the work certain configurations, outlines and dimensions as may be determined by one or more patterns; and has for certain objects the production of such a system which is capable of a high degree of accuracy and which is operable at higher speed than systems heretofore employed. In general the system as applied to cutting machines comprises: (1) a pattern for controlling the contour of the finished work; (2) relatively traversible and feedable work and tool holders; (3) a measuring device having a tracer traversible relative to the pattern with the relative traverse between the work and the tool holders, and (4) traversing and feed mechanisms between the tool and work holders and between the tracer and pattern controlled by small continuous variations in the measuring device as the tracer moves along the pattern and producing correspondingly and proportional corrective movements between the tool and the work. In such an example of the system the tracer is the controlling member, the work and tool, the mechanism to be controlled, and there is also the mechanism responsive to the movements of the tracer as controlled by the pattern which controls the relative movements of the tool and the work.

In accordance with a preferred method, a simple vacuum tube oscillator supplies a small amount of power to the measuring device mounted on, say, the tool carriage. This device includes an electric circuit approximately resonant to the frequency supplied by the oscillator and provided with a variable frequency tuning element responsive to variations between a part carried by the tracer which follows the pattern, or by the pattern itself, and a part fixed to the tool carriage. Because of greater convenience in construction and operation this tuning element is preferably a condenser, the two parts being two plates thereof. Where one of these elements is carried by the tracer, this tracer is spring pressed toward the pattern and variations in capacity different from a null position but independent of the speed with which the displacement occurred between the maximum and minimum spacings operate controls for the movement of the tool carriage in corrective directions. While any suitable type of tracer may be employed, I prefer to use the tracer and mounting fully described and claimed in the patent application of Wilfred H. Howe, Serial No. 632,937 filed September 13, 1932, for Pattern control mechanism and tracer therefor since with that type of tracer and mounting very accurate control of the tool to cut abrupt shoulders on the work in accordance with like shoulders on the pattern is possible. If desired the pattern itself may form one plate of the condenser, the cooperating plate being carried by the tool carriage.

When the tool carriage is in such position that the tracer does not touch the pattern at all or with less than sufficient pressure to deflect its spring mounting to cause the condenser plates to assume a null position, or by other means, the capacity at the measuring unit is greater than the null, this produces a voltage greater than the null voltage which operates the control equipment causing the tool carriage to move toward the pattern, carrying the tool against the work, until the capacity of the condenser is decreased to null when the motion ceases. When the tracer bears too firmly against the pattern or by other reason the capacity of the measuring condenser is lower than null, a drop in voltage is produced which operates the control equipment to draw the tool carriage away from the pattern until the null capacity is reached when the motion stops. As long as the relations of the two condenser plates are kept at null as by a predetermined constant pressure of the tracer point against the pattern, there is no motion of the tool carriage toward or from the pattern so that there is no feed or retractive motion of the tool relative to the work and transversely to its relative traversing movement. A low or high place on the pattern causes a correcting in or out motion of the tracer and tool as the carriage is moved longitudinally or traversed to carry the tracer across the pattern. These relations of capacity variation to correcting motion of the carriage might be reversed but the relations described are preferred for reasons of mechanical safety to the tracer assembly, since with this arrangement accidental electrical contact between the condenser plates reduces the voltage across them to zero, withdrawing the tracer from the pattern very rapidly, thus obviating danger of jamming of the parts. This correcting motion of the tracer and tool carriage as herein shown in the preferred form is produced by amplifying and rectifying the low voltage of the measuring circuit and employing it to control the grids of two power controlling tubes of the ionized gas type with grid control. Two examples of this class of tubes are known commercially as "Thyratron" and "Grid Glow." This direct current voltage is so connected that as the voltage is increased from that corresponding to null position of the condenser plates, one power tube passes current to drive a tool carriage feed motor in one direction and when this voltage is decreased the other power tube passes current to drive the feed motor in the reverse direction.

This feed motor moves the tool and tracer carriage in correcting direction in either case and the control is continuous with continuous variation in measuring capacity rather than step by step. Power control tubes of the type here employed pass current only when the grid is biased up to a definite point positively and will continue to pass current when this point has been reached or passed as long as the plate voltage remains in the proper direction regardless of subsequent changes in grid voltage. Control of such tubes by the variations of a direct current grid biasing voltage is not per se my invention.

Longitudinal motion of the tool carriage is obtained from another reversible variable speed motor operated through a third power tube. The grid of this third power tube may receive its control voltage from the drop across the armature of the transverse or feed motor. Rotation of the feed motor armature produces a back electromotive force proportional to its speed and its field strength at the time, and this voltage, after being filtered, is used to bias the grid circuit of the third tube so that an increase of feed motor speed produces an increasingly negative potential on the grid of the third power tube until all flow of plate current to the longitudinal or traverse motor is cut off. With the armature of the transverse or feed motor at rest, no negative voltage is produced, hence the current through the third power tube drives the longitudinal or traverse motor at full speed. By this means the tool may be operated to accurately follow taper configurations of the pattern. This action of the mechanism may be further improved to avoid over-travel of the tool carriage caused by inertia of the rapidly rotating feed motor armature after the power is shut off, so as to produce what may be termed a corrective follow-up, the speed of return to null relation of the condenser plates being greater the further these plates are displaced from their null position but independent of the speed with which the displacement occurred. This will be later described in detail.

Mechanism may also be provided by which when the traversing motor has completed a traverse in one direction it may be returned to its initial position with an idle traverse uncontrolled by the pattern, or it may be so designed as to produce an indexing movement between the work and the tool, or between the pattern and tracer and if desired between both the tool and work and the pattern and tracer and then effect the return traverse under control by the pattern. This last method of control is particularly suitable for machines such as die sinkers or the like where the work is to be cut in three dimensions under controlled conditions and may also find other application as where it is desired to cut to finished contour in accordance with a series of pattern contours successively presented.

For a more complete understanding of this invention, reference may be had to the accompanying drawings in which Figure 1 is a front elevation of a lathe embodying this invention.

Figure 2 is a fragmentary top plan of the same.

Figure 3 is a detail section on line 3—3 of Figure 1.

Figure 4 is a headstock end elevation of the lathe.

Figures 5 and 6 are detail perspectives showing modified forms of pattern, and pattern and tracer, respectively.

Figure 7 is a view somewhat similar to Figure 2, but showing indexed work and pattern instead of rotary work, and with a rotary cutting tool.

Figure 8 is a section on line 8—8 of Figure 7.

Figure 9 is a fragmentary front elevation of the machine of Figures 7 and 8.

Figures 10 and 11 are detail sections to a larger scale on lines 10—10 and 11—11, respectively, of Figure 9.

Figures 12 and 13 are wiring diagrams illustrating one form of both hand and automatic control where the return traverse between the tool and the work is idle.

Figure 14 is a wiring diagram for use in connection with the diagram in Figure 12 and illustrating therewith a control where each direction of traverse is a working traverse.

Figure 15:
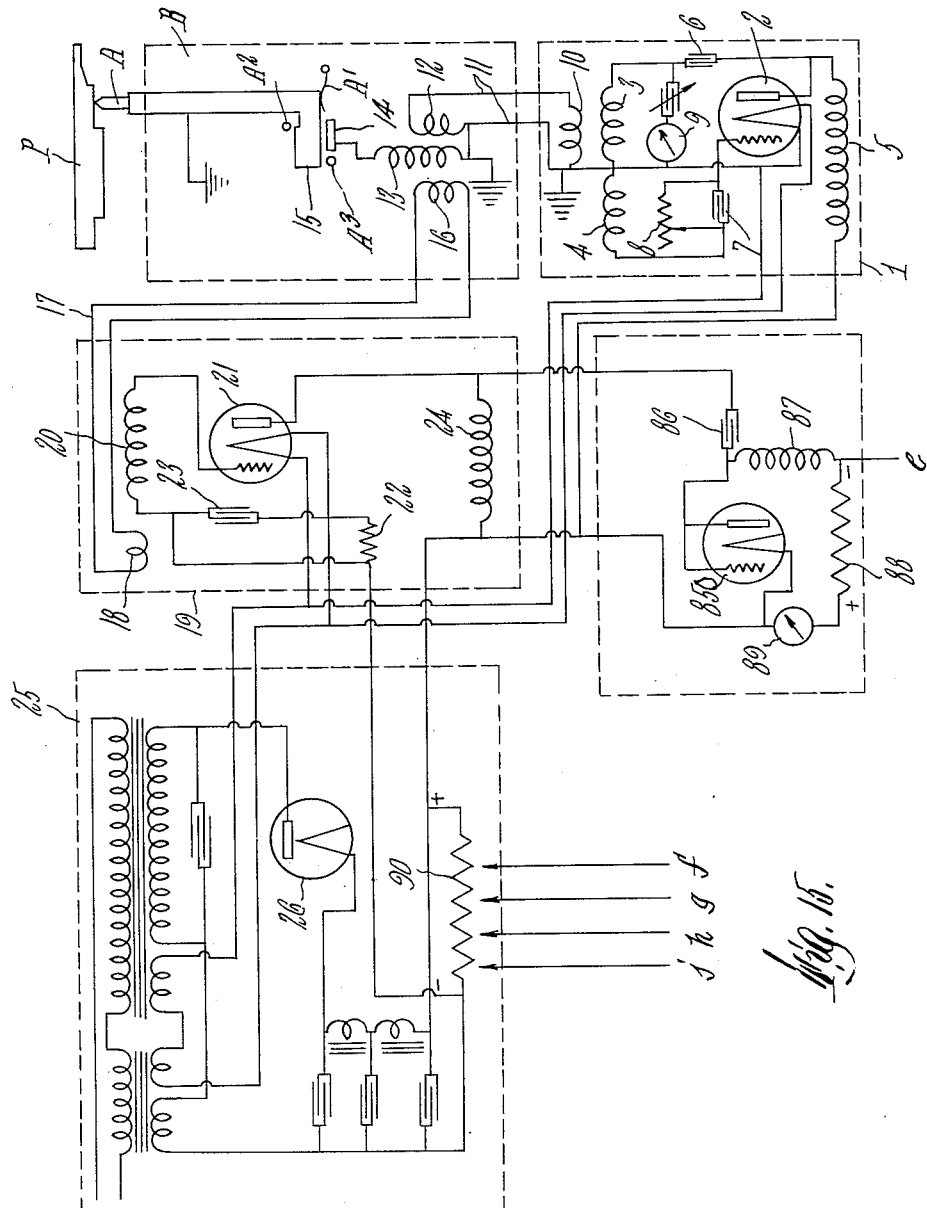
Figure 16:
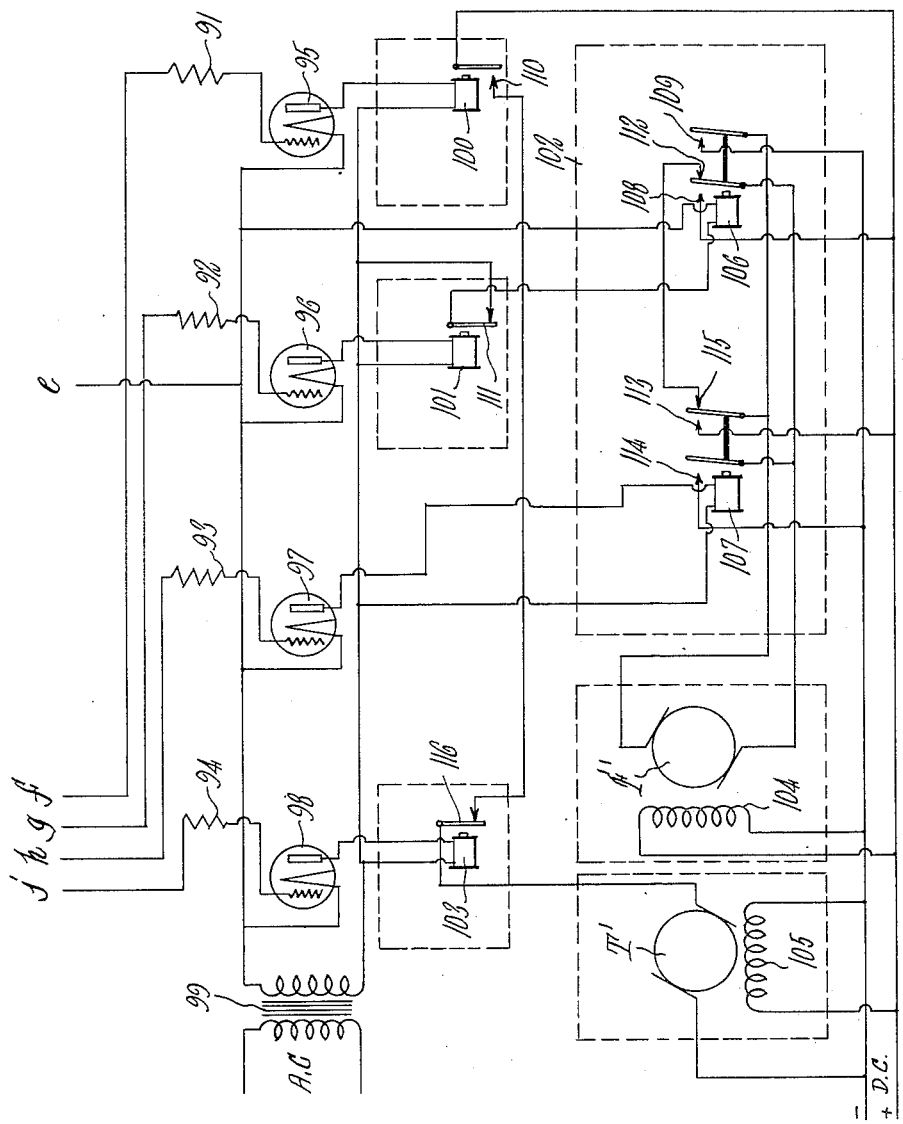

Figures 15 and 16 are wiring diagrams illustrating another form of control.

Figure 17 is a detail transverse section through the tool carriage showing a corrective control mechanism.

Figure 18:
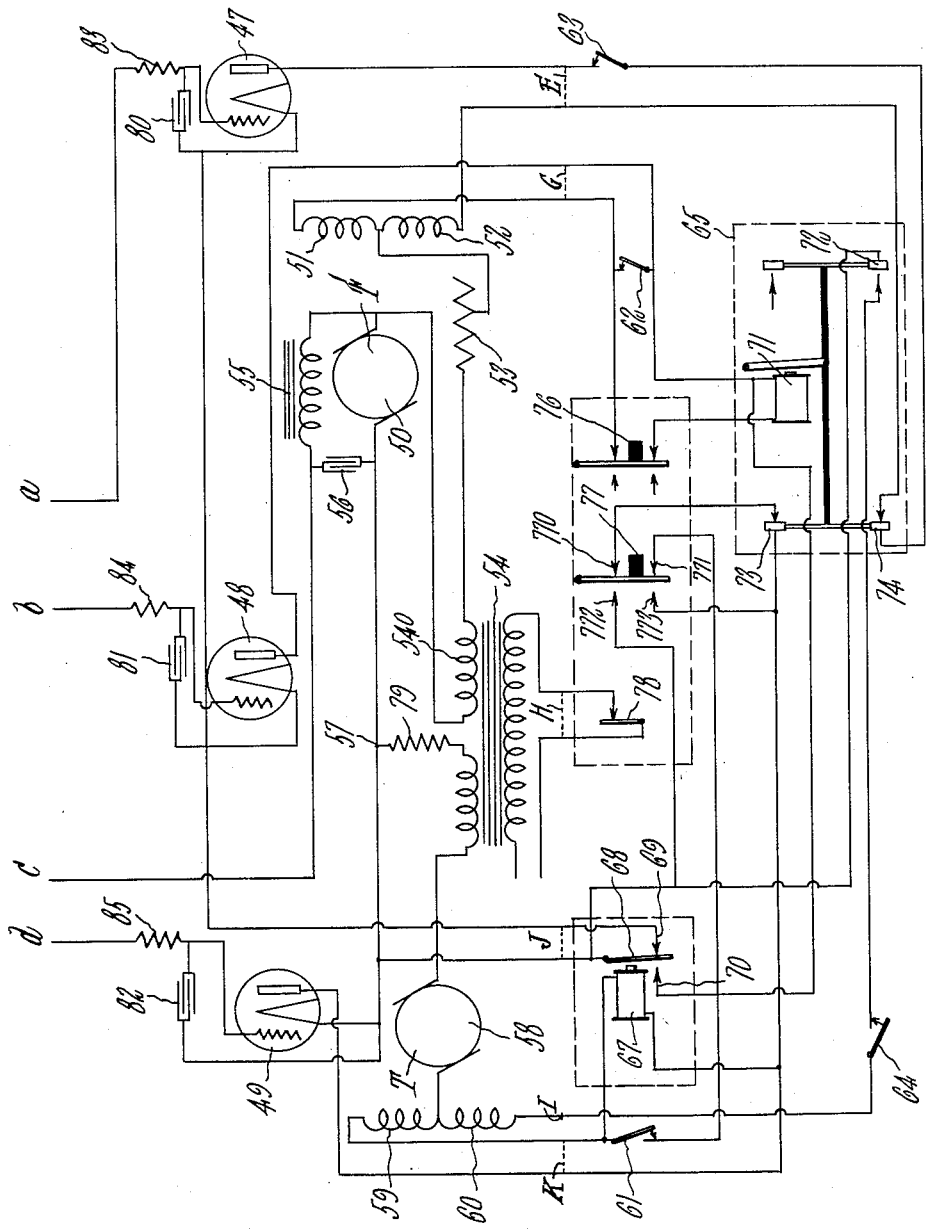

Figure 18 is a fragmentary perspective showing a corrective control mechanism applied to the tailstock center.

Figure 19 is a wiring diagram applicable to the mechanism of Figures 17 and 18.

Referring first to the machine shown in Figures 1 to 4 inclusive and the diagrams of Figures 12 and 13, a pattern P having an edge contour across which a tracer A of the general shape and dimensions of the cutting tool may be traversed is secured a fixed position to the machine bed. B indicates a tool carriage mounted on a traversing carriage $B^1$ movable axially of the work and the pattern. The carriage B is movable transversely of the direction of traverse of and on the carriage $B^1$. This traversing movement of the carriage B, which feeds or retracts the tool and the tracer A relative to the work W, and to the pattern P, respectively, is shown as produced by rotation of the variable speed direct current motor F having an armature 50 and reverse field windings 51 and 52. This motor F may be geared to a suitable feed screw as shown in Figure 3.

The traversing motion of the carriage $B^1$ may be produced by rotation of the direct current motor T having an armature 58 and a reverse field windings 59 and 60. This motor T may drive a suitable lead screw as shown in Figure 1.

Transverse or feed control

As shown in the diagram of Figure 12, the tracer A forms part of a measuring device, the tracer having a portion pressed against the pattern edge as by a spring $A^1$ between limit stops $A^2$ and $A^3$. It carries movable therewith the condenser plate 15 cooperating with a plate 14 fixed with relation to the carriage B. When the plate 15 is at a definite position intermediate its stops, the capacity of the condenser comprising the plates 14 and 15, and their interposed air dielectric is at null value and variations of position of the plate 15 relative to the plate 14 from this null position cause an increase or decrease of this capacity which immediately causes a motion of the carriage B with the plate 14 in a direction to bring the plates 14 and 15 to their null spacing, as will later more fully appear. To this end the condenser 14, 15 is used as the tuning element of a secondary oscillatory circuit in approximate resonance with an exciting or primary oscillatory circuit.

As shown these circuits are similar to those shown in the Field Patent No. 1,813,488, granted July 7, 1931, with the exception that a regulated direct current voltage instead of an alternating current voltage is applied to the plate of the oscillator tube 2, the coupling between the primary and secondary circuits is here shown as through a coupling circuit including the coil 10 in inductive relation to the plate coil 3, the coil 12 in inductive relation to the secondary coil 13 and a feed cable 11; and as here shown, the secondary contains no current indicator. Instead of the current indicator in the secondary oscillatory circuit, a coil 16 of a few turns is arranged in inductive relation to the coil 13, and the voltage induced therein is used to actuate and control various devices as will later appear. The capacity of the measuring condenser 14, 15 and the voltage across the inductance 13 varies inversely with the spacing of the plates 14 and 15. The variable voltage induced in the coil 16 is insufficient for proper control work hence radio frequency amplification is necessary. The voltage induced in the coil 16 is carried through the cable 17 to the coil 18 in the amplifier unit 19. The voltage across the cable 17 is of the order 15 to 20 volts but due to the rather high effective inductance of the coil 18, the current is quite low. The high capacity between the wires of the cable 17 limits radiation of the electromagnetic waves to a negligible value. The coil 18 induces a voltage of somewhat greater magnitude in a coil 20 of more turns than the coil 18, and this is applied to the grid circuit of a three-element tube 21. Any tube suitable for radio frequency amplification may be used and in case a tube of high amplification is used, the untuned transformer 18, 20 may be omitted, the cable 17 then being connected directly to the grid circuit of the tube 21. Negative grid bias potential is secured for this tube 21 by passing the direct current plate supply power for the oscillator tube 2 as well as for the amplifier tube 21 through a resistance 22 in the filament side of the tube 21, thus making the filament of the tube 21 more positive than its grid. The grid return circuit connects direct to the negative end of the direct current power supply. A radio frequency by-pass condenser 23 is connected across the resistor 22. The biases and plate voltages employed should be of proper values to secure substantially a linear amplification of the impressed alternating current grid voltage. The resulting amplified alternating current voltage is taken from across the extremities of an inductance 24 in the plate circuit. This modified radio frequency voltage is of sufficient potential but it cannot be satisfactorily combined with the direct current grid voltages and the commercial frequency phased alternating current for inverse operation of the grids of the power control tubes 47 and 48 shown in Figure 13 and hereafter more fully treated.

In order to be satisfactorily combined, this high frequency alternating current voltage is converted to direct current voltage as by means of two separate rectifiers in the unit shown enclosed by dotted lines at 27 in Figure 12. It is necessary to insulate these rectifiers from each other and from the direct current plate supply, so the voltage from across the coil 24 is passed through four isolating condensers 28, 29, 30 and 31 to the plate and filament connections of two rectifier tubes 32 and 33 in the unit 27. The grids of the particular tubes shown are illustrated as connected to their respective plates to lower the internal impedances of the tubes, the tubes functioning as though they were two-element rectifiers which could be substituted if desired. The operation of these radio frequency rectifiers, like that of any hot cathode tube, allows the passage of current through the tube when the plate is positive with respect to the filament. The internal impedance is so low under this condition that current passes through the tubes rather than through the associated high inductances 34, 35 and the high resistances 36 and 37 which by-pass these tubes. However, when the plates of the tubes have negative charges impressed thereon and the filaments positive charges impressed, the internal impedances of the tubes is extremely high and the lower impedance path is through the associated inductances and resistances. As before noted the inductive reactances of the coils 34 and 35 are very high at the frequency used so that current flow through them is choked back on a rising voltage and held over on a falling voltage. The result of the rectifying and filtering action of the tubes and inductances is the production of substantially a direct current flow through the resistors 36 and 37 and consequently a substantially smooth direct current potential across each of them, the magnitude of the voltage varying with the impressed alternating current voltage from the radio frequency amplifier tube 21. A milliammeter 38 may be placed in series with the direct current side of one of these rectifiers and this gives an accurate indication of the position of the measuring condensers 14 and 15 of the measuring unit. By its indications the set up of the null capacity and several other checks may be performed.

The direct current voltages across the resistances 36 and 37 are used along with the proper amounts of direct current voltage from a drop resistor 39 of the power supply unit 25 (hereinafter more fully described) together with alternating current voltage of the proper phase and magnitude from the unit 40 (Figure 12) to be later described, to control the grid circuits of the power tubes 47, and 48 shown in Figure 13. The grid of the power tube 49 is biased partly from the drop resistor 39 and partly from the unit 40. The connections between the portions of the diagrams in Figures 12 and 13 are shown by the leads a, b, c, d, common to the two figures.

The point 57 of Figure 13 is common to all the power tube filaments so that the potential between grid and filament of the tubes 47 and 48 consists of the sum of the direct current voltage across the motor armature 50, a constant portion of the direct current voltage across the resistor 39, a constant portion of the alternating current voltage across the potentiometers 45 and 44, respectively, and direct current voltage from the rectifying system 27 which is variable with the variation in the capacity of the measuring condenser. The effect of variation of armature 50 voltage will be further considered under the heading "Corrective feed motor control." The potential between the grid and filament of the tube 49 consists of the sum of the voltage across the armature 50, which is variable with the speed of the feed motor, and a constant portion of the direct current voltage from the unit 39 and the constant alternating current voltage from the potentiometer 46.

Regulation of the voltages supplied to the plates and filaments of the oscillator tube 2 and the amplifier tubes 21 is accomplished by the regulating transforming unit 25 (Figure 12).

This insures essentially a constant supply of radio frequency voltage from the oscillator to the measuring unit and a uniform amount of amplification of the response voltage from the measuring unit. Direct current voltage is supplied to the plates of these tubes to make sure that no low frequency modulation of the radio frequency currents in either oscillator or amplifier appears in the output voltages of the rectifiers for the phase of any modulated direct current output would probably not be in the proper relation. For satisfactory speed control of the motors F and T fed by the power tubes, it is imperative that a minimum of in-phase alternating current voltage be applied to the power tube grids and that the major portion be out of phase alternating current voltage supplied from a controlled source.

For simplifying the description of Figure 13 it will be taken in two sections, the portions above the center being taken first and being the actual control, the lower portion being taken second and being supplementary to the main control system. In order to simplify the description also, dotted lines indicating jumpers have been drawn between wires joining the upper and lower portions of the diagram at E, G, H, J and K. Dotted line I cuts off one of the wires, it having use only in the supplementary circuit. When the position of the measuring plates 14, 15 is at null which gives a desired reading of the ammeter 38 of Figure 12, the voltage from the resistor 39 is set to such a value that the power tubes 47 and 48 are just passing no current. Under such conditions any change in capacity at the measuring condenser from the null value will vary the direct current potentials across the resistors 36 and 37, both rising and falling together. As will be seen from the circuit diagrams of Figures 12 and 13, the negative end of the resistor 37 connects through the lead b with the grid of the tube 48, while the positive end of the resistor 36 connects through the lead a to the grid of the tube 47. An increase of capacity at the measuring unit by closer approach to each other of the plates 14 and 15 than their null position increases the voltage across the resistors 36 and 37 and the positive end of the resistor 36 becomes more positive than before, causing the grid of the tube 47 to become more positive and allowing the passage of plate current through the tube 47, jumper E, field coil 52 of the motor F, the resistor 53, power transformer 54, armature 50 of the motor F and the jumper J back to the filament of the tube 47, thus causing the motor F to rotate and to move the carriage B to bring the tool toward the center of the work and the condenser plate 14 away from the tracer plate 15 to further separate the condenser plates 14 and 15 until their null position is reached. At the same time the tube 48 receives a grid charge as much more negative than its null positive charge as the grid of the tube 47 received a positive charge, thus effectually blocking passage of plate current through this tube. A lowering of the capacity of the condenser unit 14 and 15, as by a separation of the plates 14 and 15, due to the pattern pushing back on the tracer, lowers the voltage across both of the resistors 36 and 37, and since the negative end of the resistor 37 is connected to the grid of the tube 48 through the connection b, its negative charge falls, allowing the passage of plate current through the jumper G, field coil 51, resistor 53, power transformer 54, armature 50, and jumper J, back to the filament of the tube 48. This causes the motor F to rotate in the reverse direction, withdrawing the tool from the work and moving the condenser plate 14 toward the plate 15, thus causing the tool to be moved in a direction corresponding to the movement of the tracer point by its engagement with the pattern and this takes place until the null position of the plates 14 and 15 is again reached. This fall of grid voltage also lowers the positive charge on the grid of the tube 47 by the same amount that the negative charge on the grid of the tube 48 fell, thus effectively preventing any plate current flow through the tube 47. The speed of the motor F may be further controlled through a resistance at 53.

*Corrective feed motor control*

In a control system of the type herein illustrated it is highly desirable to have the speed of the traverse or feed motor F proportional to the departure of the tracer from its null position. Due to the inertia of the motor armature, however, this cannot be perfectly attained but by what may be termed a corrective follow-up between the control motor and its controlling circuit a very considerable improvement in the motor control may be secured. Since the voltage across the armature of a motor varies with its speed, advantage may be taken of this to use the back electromotive force from the feed motor F to negatively bias the grids of the power tubes 47 and 48, thus acting as a supplementary or modifying control of the current supplied to the motor F.

In the arrangement shown the lead c from the resistor 39 extends to one side of the motor F armature through the choke 55 and the opposite side of this armature is connected to the point 57 common to the filaments of the tubes 47, 48 and 49. The chokes 55 and the condenser 56 act together as a filter to smooth out the voltage impulses across the armature. The higher the speed of the motor, therefore, the more negative becomes the bias voltage on the grids of these power tubes. A change of measuring condenser capacity to or toward null produces an instant change in bias voltage from the rectifiers of the unit 27, but since the armature of the motor F is rotating rapidly there is a momentary overhanging negative direct current bias produced by the back electrotromotive force from this motor. The effect of this extra momentary negative bias is to reduce the current to the motor more than the measuring condenser calls for. The result of this momentary extra reduction in current is to allow the inertia of the revolving armature to be partly absorbed in moving the tool carriage. As the motor slows down its temporary overhanging voltage falls so that the motor stops at substantially the same time that the tracer reaches the null position, the whole effect being to shut off the current to the motor early and to allow the motor to coast the tool carriage to its proper location. With very high motor speeds over-travel of the tool carriage of only a small fraction of $1/1000$ of an inch may be easily secured. Immediate correction of the over-travel is made by the measuring unit acting to reverse the rotation of the motor but at a much lower speed. When the tracer departs from the null position the measuring condenser instantly starts an impulse producing a positive bias on the grid of either the tube 47 or the tube 48 and since then there is no opposing negative potential from the armature, which is then at rest, the motor starts immediately and rapidly attains the speed called for by the measuring condenser.

The control of the power tubes by means of a variable direct current voltage facilitates the application of various other variable correction factors as may be desired. For example, correction may be made for the springing of the tool or the work, or both, under the working pressures therebetween. Referring to Figure 17, a tool 300 is shown carried by a tool post 301 of conventional form mounted on the tool carriage B. Beneath the forward portion of the tool is positioned a carbon pile which is essentially a variable resistance, the resistance decreasing with increased pressure. An abutment 303 engaged by the tool rests on this pile which is supported on the carriage B and the pressure between the tool and the work forces this abutment against the pile, compressing it in accordance with the pressure between the tool and the work so that the resistance of the pile varies with the amount of this pressure. This pile is connected in series with a source of direct current potential 304 as shown in Figure 19 and a resistor 305. An increase of pressure between the tool and the work causes the tool to bend down, compressing the pile 302 so that its resistance is reduced. This increases the current flow in the circuit comprising the pile 302 and resistor 305, producing a rise of voltage across the resistor 305 and a voltage drop across the pile 302. Either the pile 302 or the resistor 305 may be interposed in the lead c between the diagrams of Figures 12 and 13, which of these connections being used depending on whether the tool is so set as to tend to dig in too far or to spring out too far and dependent also on the polarity of the source 304, so as to effect a corrective motion of the carriage B. In Figure 18 the pile 302 is shown as supported between a fixed bracket 310 and the tailstock center 311 so that pressure from the tool tending to spring the work and the center will be effective to determine the resistance of the pile, this being connected as shown in Figure 19. If both corrections were to be made, two such piles, one responsive to the bending of the tool and the other responsive to lateral movement of the center would be included in the circuit with the resistor 305, or two such corrective circuits could be interposed in the lead c whichever would be the most convenient in any particular case.

*Longitudinal or traverse motor control*

The control of the motor T is complementary to that of the motor F. The system is so arranged that with the motor F operating at full speed either forward or backward the motor T will be at rest and with the motor F at rest motor T will be running at full speed. A low intermediate speed of the motor F produces a rapid intermediate speed of the motor T and vice versa. To accomplish this type of control advantage is taken of the fact that the back electromotive force across the armature 50 of the feed motor F varies roughly with its speed, and since all current flowing through this motor by way of the power tubes is unidirectional the voltage across the armature always has the same polarity. The voltage impulses smoothed out somewhat by the choke 55 and condenser 56, are used as a negative grid bias for the power control tube 49 along with some steady direct current bias from the drop resistor 39 through the connection d.

Set up is made with the motor F running full speed and the direct current bias from the resistor 39 is regulated by adjusting the lead line d therealong to such value that the tube 49 just shuts off all plate current to the motor T. There is also a certain amount of phased alternating current voltage picked up from the source 46 of the unit 40 (Figure 12) to provide smooth plate current control with varying direct current positive grid swing. Positive grid bias on the tube 49 above its critical current passing value passes plate current through the jumper K, the field coil 59, armature 58, power transformer 54, speed control resistance 79 and back to the filament of the tube 49 which causes the motor T to run in a direction to give a traverse in one direction of the carriage B¹ lengthwise of the work and the pattern.

The motor T is also provided with a reversely wound field 60 through which current may be passed by suitable control mechanism hereinafter described, to traverse the carriage in the opposite direction either idly or during control of the tool by a pattern, as will be more fully explained.

*Picture frame motion with idle traverse*

The lower portion of Figure 13 illustrates both an automatic and manual control of the carriage B¹ return. Travel stop switches 61 and 64 may be mounted as shown in Figures 1 and 2 so as to be opened at opposite limits of motion of the traversing carriage B¹, while limit switches 62 and 63 are opened by transverse travel of the tool carriage B. The switch 63 is a safety switch which limits the inward travel of the tool but this is set further inwardly than the maximum which it is desired this carriage to travel inwardly through pattern control so that normally it is not operated, the inward limits of motion being determined by the pattern. The outer limit switch 62, however, may determine the limit of back or retractive motion of the tool carirage, being set sufficiently back so that the tool will clear all parts of the work for its return idle traverse, this "picture frame motion" (so called) producing a movement of the tool controlled by the pattern during one direction of traverse, a retraction of the tool from the work at the end of this traverse and a return to the starting traverse point with the tool retracted and out of control of the pattern. The finished work may then be taken out of the machine and new work inserted, whereupon the tool may again be controlled by the pattern and the working traverse started. For this picture frame motion the jumpers at E, G, H, J, K are not employed nor is the line cut at I and during normal cutting operations of the machine all of the limit switches 61 to 64 are closed. Motion of the tool carriage parallel to the longitudinal axis of the pattern and under control by the pattern eventually opens the limit switch 61 which stops the longitudinal motion by cutting off current to the motor T through the armature 58 and the field coil 59. Opening of this switch impresses a voltage on the relay coil 67 which opens the contact of the switch arm 68 at 69, thus stopping flow of current to the tubes 47 and 48, while contact is made at 70 supplying power directly to the motor F through the limit switch 62 and the field coil 51, which caused withdrawal of the tracer from the pattern and the tool from the work. This persists until the limit switch 62 is tripped open after the tracer has been drawn back beyond the highest point of the pattern, this stopping the withdrawal of the carriage B supporting the tracer and the tool. When this switch 62 is opened the voltage across it energizes the coil 71 of the relay 65 which closes a contact at 72 and opens contacts at 73 and 74. Closing the contact 72 causes current to flow through the motor T through the field coil 60 which reverses the direction of rotation of the traverse motor T, thus causing the carriage B¹ to travel toward the beginning of the cut. Opening of the contact at 74 opens the plate circuit to the tube 47 and is a safety measure insuring that the tracer may not be advanced toward the pattern during the reverse longitudinal traverse motion of the carriage B¹. The opening of the contact 73 is to insure a holding current for the relay coil 67, even after the carriage has left the switch 61 which immediately closes. Return of the carriage in reverse longitudinal direction continues until the limit switch 64 is opened, whereupon the motor T is stopped, leaving the carriage B¹ opposite the beginning of the cut and away from the work. When the finished work has been removed and new work inserted, momentary pressure on a push button 76 opens the holding current to the relay coil 71, allowing the contact to be closed at 73, short circuiting the relay coil 67 and allowing the contact at 70 to open and at the same time closing the contact at 69, thus returning the parts to their normal running position. The tracer point not being in contact with the pattern and the measuring condenser thus having a capacity much higher than null takes control, energizing the feed motor F to advance the tracer toward the pattern and the cycle of operations is repeated. The current requirements of the relay coils 71 and 67 which are fed through the motor circuits are so low that actuation of these does not result in rotation of the motors. Push button 77 may be provided, the pressure of which acts to open one set of contacts at 770 and 771 and to close another set at 772 and 773 to stop the longitudinal feed motor T and to actuate the motor F to withdraw the carriage from the pattern. In normal operation the flow of current through the control tube 49 will provide energy for the holding relay coil 67 but in case no current is passing through the tube 49 depression of the button 77 short circuits the plate and filament of the tube 49, supplying the relay coil 67 through the windings of the traverse motor T. Switch 78 is a power off and on control.

Power supply

Power for operation of the whole system may be taken from any commercial frequency alternating current power line and is transformed to suitable voltages for the several circuits by the transformers in the units 25 and 40 and the transformer 54. The filaments of the tubes 2 and 21 are supplied by the voltage regulating power supply transformer of the unit 25. The high voltage winding of this voltage regulator is connected directly to a standard type rectifier-filter circuit having a rectifier tube 26, the direct current out-put of which is fed to the plates of the tubes 2 and 21. Straight alternating current at a suitable voltage is fed to the plates of the power control tubes 47, 48 and 49 from the secondary of the transformer 54.

The unit 40 comprises the transformer 43 having separate secondaries 44, 45 and 46 from which alternating current voltage for helping to bias the grids of the power tubes 48, 47 and 49, respectively, are obtained. Their taps to the resistor 39 are adjusted to determine the amount of direct current bias superposed thereon from this resistor for the controlling direct current voltage from the resistors 36 and 37 to cause rotation of the armature 50 of the motor F in one or the other direction whenever null measuring voltage is departed from in either direction, and to modify the rotation of the armature 58 of the traverse motor T on operation of the motor F. The phase of this alternating current voltage with relation to that impressed on the power tube plate circuits from the transformer 54 is determined by the relative impedance values of the resistance 41 shunting the primary of the transformer 43 and of the choke 42.

Should it be desired to control by a pattern the cut across the end face of work supported in a rotary chuck, the motor F would then become the traverse motor and the motor T would become the feed motor and these motors would have to be interchanged in the circuits shown, and the pattern and tracer would be arranged at right angles to the position shown in order for movements of the carriage B on the carriage B¹ to effect the traverse between the tracer and the pattern and the motion of the carriage B¹ on the machine base to effect relative feed between the tool and the work and to bring the tracer measuring unit toward its null value on departures in either direction therefrom.

Double working traverse control

Instead of producing an idle return traverse between the tool and the work and between the pattern and the tracer the return traverse may, if desired, be a working traverse. When this is done, at the ends of each traverse the work may be indexed to bring a fresh surface thereof into position for the tool to cut and if the contour desired therefore is different from that desired for the previous cut, the pattern may be indexed also to present the desired different pattern contour to the tracer. In some cases, also, where the pattern is of such a contour that a single pass of the tool to produce the desired cut in the work would involve a too heavy cut in some portions at least of the work, the work may be cut first in accordance with a pattern with less pronounced changes of configuration than the final desired form and then the tool may take a second cut controlled by a pattern of the final contour. Of course more than one intermediate pattern might be employed if desired. In such a case the patterns might be indexed between the passes of the tool while the work might require no such indexing motion. Where the work is of a character which is not rotated, it will usually be necessary also to use a rotary cutting tool rather than to rely on the traverse and feed motors to produce the entire cutting effort. It might be noted here, also, that indexing of either the work or the pattern, or both, will usually be found necessary whenever there is provided a plurality of automatic traverses between the tool and the work whether or not both directions of traverse are working traverses.

A method utilizing both directions of traverse as working traverses is illustrated in Figures 7 to 11 and diagrammatically in Figure 14 taken in connection with Figure 12. The mechanism shown in the diagram of Figure 14 is the same as that shown in Figure 13 above the dotted line jumpers E, G, H, J and K but below these lines it is different. As shown best in Figures 9, 10 and 11, a rock shaft 200 is mounted longitudinally of the machine frame and carries at suitably spaced points defining the desired traverse limits of the traversing carriage B¹ cam collars 201 and 202 each having an inclined cam slot 203 within which may ride an actuating pin 204 carried by a portion 205 depending from the carriage B¹ so that adjacent to the ends of its traverse the shaft 200 is rocked in one or the other direction. Carried on one end of this shaft 200 is a disk 206 supporting a pair of mercury switches 116 and 117 so arranged that on the rocking of the shaft from one to the other of its rocking limits, one of these switches is opened and then on a slight further rocking in the same direction the other of these switches is closed. These switches take the place of the traverse limit switches 61 and 64 shown in Figure 1 and they are connected into the circuit as shown in Figure 14.

During operative traverse of the carriage B¹ in one direction the contact 116 is closed, as shown in full lines in Figure 14, the field coil 59 of the traverse motor being energized. As the carriage approaches the end of this traverse the shaft 200 is rocked sufficiently to open the switch 116, causing the voltage across this open switch, which is essentially the full voltage of the transformer 54, to be impressed on the coil 119 of the relay 118. Coasting of the tool carriage after the switch 116 is open, closes the switch 117 and would immediately reverse the longitudinal motion of the carriage by passing current through the field coil 60 of the motor T but for the fact that by the operation of the relay 118 before the switch 117 was closed, the contact 121 was opened, shutting off power to the motor T but still providing current to hold the relay 118. The operation of the relay also opens the contact 120 and closes the contacts 122 and 123. The opening of the contact 120 shuts off the power supply to the tubes 47 and 48 so that the measuring condenser is no longer in control of the operation of the motor F, while the closing of the contact 122 supplies full voltage of the transformer 54 through the resistance 53 to the transverse feed motor F in a direction to rapidly withdraw the tracer from the pattern until the limit switch 124 (see Figures 14 and 7) is opened. Opening of this switch 124 shuts off the power to the motor 50 and the voltage across the opened switch energizes the coil 126 of the relay 125, opening the contact at 128 and thus opening the holding circuit to the relay 118. The relay 118 then is actuated as by the spring 130 to open the contacts at 122 and 123 and to close the contacts at 120 and 121, whereupon normal control of the tracer and tool carriage through the power tubes 47, 48 and 49 is resumed. This causes the feed motor to advance the tracer to the pattern and when it has been actuated by contact therewith to a sufficient extent the traverse motor T begins to operate but at this time in a reverse direction to that before since its field coil 60 rather than its field coil 59 is now energized.

The closing of the contact at 123 before the machine is again brought under the control of the measuring mechanism at the end of each traverse may be used to actuate the solenoid 135 of an indexing mechanism. As shown in Figures 7 and 8 this indexing mechanism acts upon both the work and the pattern, although as before pointed out it might act on either or both, depending on conditions. As shown this indexing motion is rotary although it should be understood that it might be of any other type. The actuation of the solenoid 135 swings an indexing lever 136 having a dog 137 operating to turn a ratchet wheel 138, a holding pawl 139 preventing back motion thereof. This ratchet wheel 138 is carried on a shaft 140 to which is fixed the work holding dog 141 provided it is desired to index the work, and the rotation of the ratchet wheel may be imparted to a shaft 142 to which is secured for rotation the pattern P¹, as by means of a sprocket chain 144 engaging sprocket wheels 145 and 146 fixed to the shafts 140 and 142, respectively. If the work only is to be indexed the chain 144 may be omitted, and if the pattern only is to be indexed, the ratchet wheel 138 will be fixed to the sprocket wheel 145, both being loose on the shaft 140 and the chain 144 will be used. As shown also in Figures 7 and 8 the tool may be a rotary milling cutter 150 which may be driven by a motor 151 through suitable belt connections as at 152.

*Tube relay pattern control*

In Figures 15 and 16 is illustrated diagrammatically a different form of control mechanism for the traversing and feeding motors, this mechanism, however, being incapable of the high speed and high accuracy of the controls heretofore described, although for some purposes it may be satisfactory. In this arrangement but one rectifier for the voltage derived from the measuring unit is necessary and this acts to provide a positive potential varying with variations of capacity of the measuring mechanism condenser to a series of separate and differentially biased power tubes so that they will come serially into or out of action with small increments of capacity variation.

In this system, as shown in Figure 15, the measuring condenser is shown reversely arranged from that of Figure 12 so that the capacity is decreased rather than increased on movement of the tracer point outwardly relatively to the carrier, though it might be in the same arrangement if desired. There is but one rectifier unit having a rectifier tube 850, a resistance 88 and an inductance 87, the plate and grid being connected together and both to the plate of the amplifier tube 21 through a condenser 86. The positive end of the power supply resistance 90 of the unit 25 is connected directly with the positive end of the rectifier output resistance 88. Connections e, f, g, h and j of Figure 15 are the same as the correspondingly marked connections in Figure 16 and connect through grid current limiting resistors 91, 92, 93, and 94 with the grids of the power tubes 95, 96, 97, and 98, these tubes being similar to the power tubes 47, 48 and 49 shown in Figure 13. These tubes respectively operate relays 100, 101 and 103 and two relays in a unit 102 whose contacts control the feed and traverse motors F¹ and T¹ respectively. The relay 100 has a contact 110 closed when the relay is energized and the relays 101 and 103 have contacts 111 and 116, respectively, which are opened when these relays are energized. The unit 102 comprises two relays having the magnet coils 106 and 107, respectively, each of these relays being double. The relay having the coil 106 has a single back contact at 112 opened when the relay is energized and which is connected with a back contact 115 opened when the coil 107 is energized. With both these relay coils 106 and 107 unenergized the armature 104 of the feed motor F¹ is disconnected from the line and is short circuited so as to produce dynamic braking of this motor.

With the arrangement shown we will assume that power is applied to all the circuits and the tracer is away from the pattern. Under such conditions no appreciable direct current potential will be present across the rectifier output resistor 88, the measuring condenser having less than null capacity, and hence none of the tubes will receive a positive grid potential since they are all more or less negative from the voltage picked off the drop resistor 90 across the direct current power supply. In this condition current will flow from the transformer 99 from the alternating power source through the contact 111 energizing the coil 106 thus closing the contacts 108 and 109. Power from the direct current line feeds the fields of motors 104 and 105 and the plates of the two relays of the unit 102. Closure of the contacts at 108 and 109 supplies direct current from the line to the armature 104 of the motor F¹ causing in-travel of the tracer and a corresponding feed of the tool toward the work. This movement of the carriage continues until the measuring condenser approaching null capacity raises the voltage across the resistor 88 sufficiently to overcome the negative bias potential between the positive end of the resistor 90 and the lead f, whereupon the bias of tube 95 allows the passage of plate current from the transformer 99 through the coil of the relay 100, closing contact 110 which places the armature 105 of the motor T¹ across the direct current line, thus starting the longitudinal traverse of the carriage to move the tracer across the face of the pattern. The tube 95 is now carrying plate current and will continue to do so so long as the grid bias voltage remains sufficiently positive. Continued feed-in of the tool carriage increases the capacity at the measuring condenser and after a time raises the voltage across the resistor 88 sufficiently to overcome the bias voltage between the positive end of the resistor 90 and the lead g. This allows passage of plate current through the power tube 96 as well as through the power tube 95. Passage of current through the power tube 96 energizes the coil of the relay 101, which opens the contact 111 and de-energizes the coil 106 of the relay unit 102, opening contacts 108 and 109 and closing contact 112. This shuts off the power to the motor F¹ and applies the dynamic brake through the contacts 112 and 115, the latter having been already closed. The capacity of the measuring condenser is now at null and the only motor operating is the longitudinal traverse motor T¹ and the two tubes 95 and 96 are both passing current. They will continue to hold their respective relays as long as their grids are sufficiently positive.

A further increase of capacity at the measuring condenser above null raises the voltage across the resistor 88 until it overcomes the bias voltage between the positive end of the resistor 90 and the lead h, whereupon the tube 97 also passes plate current through the relay coil 107 and closes contacts 113 and 114. The direct current power line now supplies the armature of the motor F¹ to produce a retractive motion of the carriage, retracting the tracer and the tool from the work. Under these conditions there are three tubes passing plate current and they will continue to do so as long as their grids are held sufficiently positive.

A still further increase in capacity at the measuring condenser raises the voltage across the resistor 88 to overcome the bias between the positive end of the resistor 90 and the lead j, whereupon the power tube 98 passes current which energizes the coil of the relay 103, opening the contact 116 which shuts off the direct current power to the armature of the motor T¹, thus stopping the traverse of the carriage and the tracer relative to the work and pattern, while the motor F¹ continues to withdraw the carriage, thus withdrawing the tracer from the pattern. There are now four power tubes passing current and they will continue to do so as long as their grids are held sufficiently positive. As soon, however, as the tracer has been withdrawn sufficiently to reduce the capacity of the measuring unit to a point where the tube 98 can no longer pass current, the traverse motor again begins to operate and on further decrease to the null point the outfeed of the carriage is stopped. The action of these relays may be summarized with the various tubes in operation as follows:

No tubes passing current, the tool feeds in;
The first tube passing current, the tool feeds in and traverses, this producing an in-taper;
The first and second tubes in operation, the feed stops and the traverse continues;
The first, second and third tubes in operation, the traverse continues but the tool is fed out, thus producing an out-taper;
All the tubes being in operation, the tool is fed out and the longitudinal traverse is stopped.

A reduction of capacity at the measuring condenser lowers the voltage across the resistor 88 and as this lowering continues the power tubes shut off their flow of plate current progressively, beginning at the fourth.

It will be understood that when the desired limit of traverse has been reached the mechanism may be thrown out of operation by limit switches as in the mechanisms previously described, such mechanisms having been omitted from the diagram for the sake of simplicity.

*Pattern and tracer mechanism*

In the foregoing description reference has been made to the tracer engaging the edge portion of a pattern, which, as shown in Figures 2 and 7, has been a single piece shaped to the desired contour. Such a pattern, however, may take quite different forms as is illustrated, for example, in Figures 5 and 6. In Figure 5 the pattern is composed of a series of separate blocks 160, 161, 162 and 163 supported on the upper face of a suitable magnetic chuck or face plate 165, these blocks being held firmly in position by electro-magnetic means in a manner well known in the art. These blocks are so positioned on this chuck as to present an edge surface against which the point of the tracer A may engage. In Figure 6 the pattern is shown as a metallic sheet as 170 cut on one edge to the desired contour, this sheet forming one element of the measuring condenser, the other being formed by plate 171 shown formed as a disk and secured and suitably insulated from the tracer element A. In this form the plate 171 and the pattern strip 170 form the plates of the variable measuring condenser, the tracer member A being carried rigidly by the tool carriage B, capacity variations being produced by reason of variations in the opposed areas of the sheet 170 and the plate 171, their spacing being constant. For convenience the pattern plate or strip may be grounded and the plate 171 may be the high potential plate of the measuring mechanism. If desired the plate 170 may be covered with a suitable dielectric material such as 172 on which the plate 171 rides, thus to produce the proper spacing between the plates and to prevent accidental disarrangement of the pattern plate 170 which may, if desired, be formed of metal foil or other thin metallic sheet material. In null position the plate 171 partly overlies the edge of the plate 170.

From the foregoing description of certain embodiments of this invention it should be evident to those skilled in the art that various changes and modifications might be made without departing from the spirit or scope of this invention as defined by the appended claims.

I claim:

1. In combination, a work holder, a tool, a device having a continuously variable electrical characteristic, and power means in electrical connection with said device and controlled by the variation of said electrical characteristic of said device acting to change the relative positions of said tool and work holder at a rate dependent on the extent of such variation from a predetermined value.

2. In combination, a work holder, a tool, means for moving said holder and tool relatively, a device having a continuously variable characteristic, and means in electrical connection with said device and responsive to variations in said characteristic thereof from a normal value for actuating said moving means with a speed proportional to the extent of departure of said characteristic from said normal value.

3. In combination, a work holder, a tool, means for moving said holder and tool relatively, a device having a continuously variable electrical characteristic, and means in electrical connection with said device and responsive to variations in said characteristic thereof from a normal value for actuating said moving means with a speed proportional to the extent of departure of said characteristic from said normal value and independently of the rate of variability of such characteristic.

4. In combination, a work holder, a tool, a device having a continuously variable electrical characteristic, power means in electrical connection with said device and controlled by the variation of said electrical characteristic of said device acting to change the relative positions of said tool and work holder at a rate dependent on the extent of such variation from a predetermined value, and a follow-up connection between said device and power means causing the controlled motion of said means to tend to return said electrical characteristic to said predetermined value.

5. In combination, a work holder, a tool, means for moving said holder and tool relatively, a device having a continuously variable characteristic, means in operative connection with said device and responsive to variations in said characteristic thereof from a normal value for actuating said moving means with a speed proportional to the extent of departure of said characteristic from said normal value, and a follow-up connection between said device and power means causing the controlled motion of said means to tend to return said variable characteristic to said predetermined value.

6. In combination, a work holder, a tool, means for moving said holder and tool relatively, a device having a continuously variable electrical characteristic, means in electrical connection with said device and responsive to variations in said characteristic thereof from a normal value for actuating said moving means with a speed proportional to the extent of departure of said characteristic from said normal value and independently of the rate of variability of such characteristic, and a follow-up connection between said device and power means causing the controlled motion of said means to tend to return said electrical characteristic to said predetermined value.

7. In combination, a pair of relatively movable elements, means for moving said elements relatively, and electrical means for controlling said moving means to move said elements toward a normal relative position with a velocity variable in accordance with the extent of their departure from said normal position.

8. In combination, a work holder, a tool, means for moving said holder and tool relatively, a device having a portion of variable electrical capacity, and means in electrical connection with said device and responsive to the direction and extent of variation of said capacity from a predetermined value for controlling said moving means.

9. A mechanism comprising, in combination, a work holder, a tool, a pattern, a tracer device for said pattern, means for relatively traversing said work holder and tool and said pattern and tracer respectively, means for producing relative feeding movement transversely of said traversing movement between said tool and work holder and between said pattern and tracer, respectively, said mechanism including means having an electrical characteristic continuously and proportionately varied by variations between said pattern and a portion of said device, and means continuously responsive to variations in such characteristic for controlling said feeding means in directions to minimize such variations.

10. In combination, a work holder, a tool for operating on work carried by said holder, a device having a continuously variable electrical characteristic, means electrically connected to said device and proportionately responsive to the variation of said characteristic from a predetermined value for relatively moving said tool and work holder and simultaneously operable on said device to reduce such variation, and a pattern operatively related to said device to initially cause such variation.

11. In combination, a work holder, a tool for operating on work carried by said holder, a device having a continuously variable electrical characteristic, means electrically connected to said device and proportionately responsive to the variation of said characteristic from a predetermined value for relatively moving said tool and work holder and simultaneously operable on said device to reduce such variation and at a rate dependent on the extent of departure of said characteristic from said predetermined value, and a pattern operatively related to said device to initially cause such variation.

12. In combination, a work holder, a tool for operating on work carried by said holder, a device having a continuously variable electrical characteristic, means electrically connected to said device and proportionately responsive to the variation of said characteristic from a predetermined value for relatively moving said tool and work holder and simultaneously operable on said device to reduce such variation, said responsive means including apparatus for regulating the passage of electrical energy in accordance with both the direction and the amount of the departure of said characteristic from said predetermined value, and actuating apparatus operated by the energy so passed.

13. In a machine of the class described, a work holder, a tool holder, means for moving said holders relatively to cause a tool on said tool holder to operate on work on said work holder, a high frequency electrical mechanism, and means electrically connected to said mechanism and responsive to changes in frequency in said mechanism for controlling said moving means and for returning said frequency toward a predetermined value on departure of frequency therefrom.

14. A mechanism comprising, in combination, a work holder, a tool, a pattern, a tracer device for said pattern, means for relatively traversing said work holder and tool and said pattern and tracer respectively, means for producing relative feeding movement transversely of said traversing movements, between said tool and work holder and between said pattern and tracer respectively, said mechanism including means having electrical capacity varied by variations between said pattern and a portion of said device, and means responsive to variations in such capacity for controlling said feeding means in directions to minimize such variations.

15. A mechanism comprising, in combination, a work holder, a tool, a pattern, a tracer device for said pattern, means for relatively traversing said work holder and tool and said pattern and tracer respectively, means for producing relative feeding movements transversely of said traversing movement between said tool and work holder and between said pattern and tracer respectively, said mechanism including means having an electrical characteristic varied continuously and proportionately by variations between said pattern and a portion of said device, and means continuously responsive to variations in such characteristic for controlling said feeding and traversing means in directions to minimize such variations.

16. A mechanism comprising, in combination, a work holder, a tool, a pattern, a tracer device for said pattern, means for relatively traversing said work holder and tool and said pattern and tracer respectively, means for producing relative feeding movement transversely of said traversing movement between said tool and work holder and between said pattern and tracer respectively, said mechanism including means having electrical capacity varied by variations between said pattern and a portion of said device, and means responsive to variations in such capacity for controlling said feeding and traversing means in directions to minimize such variations.

17. In combination, a work holder, a tool, a pattern, a tracer controlled by said pattern, a device having an electrical characteristic continuously variable by an in and out movement of said tracer, means for traversing said tool and work and said pattern and tracer respectively, and means continuously controlled by variations of said electrical characteristic to cause said tracer to be moved laterally of its traverse and to cause said tool and work to be moved relatively laterally of their relative traverse in accordance with said pattern.

18. In combination, a work holder, a tool, a pattern, a tracer controlled by said pattern, a device having electrical capacity variable by an in and out movement of said tracer, means for traversing said tool and work and said pattern and tracer respectively, and means controlled by variations of said capacity to cause said tracer to be moved laterally of its traverse and to cause said tool and work to be moved relatively laterally of their relative traverse in accordance with said pattern.

19. In combination, a work holder, a tool, means for relatively traversing said holder and tool, means for effecting relative feed and retracting movements between said work holder and tool, and electrically controlled means for actuating said traversing and feeding means at continuously variable relative rates to cause work carried by said holder to be cut by said tool to a predetermined contour.

20. In combination, a work holder, a tool, a motor actuable to produce relative traversing motions between said holder and tool to cause said tool to traverse work held by said holder, a motor actuable to feed and retract said tool relative to said work, a tracer having a portion movable with said tool relative to the work, a pattern in operative relation to said tracer, and means actuated by variations between a portion of said tracer and said pattern to effect relative control of said motors to cause said tracer to follow said pattern and said tool to operate on the work in accordance with said pattern.

21. A mechanism comprising in combination, a tool, a work holder, a pattern comprising a plate having a pattern contour along one edge, a tracer having a plate positioned at a fixed distance from a face of said pattern plate, means to move said tracer along said pattern plate and to effect traverse between said tool and work on said holder, and means responsive to the electrical capacity between said tracer plate and pattern to cause said tracer plate to follow said edge pattern contour as said tracer plate is moved therealong and to cause said tool to operate on the work in conformity therewith.

22. A mechanism comprising in combination, a tool, a pattern comprising a plate of electroconducting material having a pattern contour along one edge, a tracer having a plate spaced uniformly from a face of said pattern plate, a carriage movable transversely to said pattern edge and supporting said tracer and tool, means for supporting work, a traversing carriage movable longitudinally of work on said supporting means and at right angles to the movement of said tool and tracer supporting carriage and carrying the same, means for moving said carriages, and means controlled by the electrical capacity of said tracer plate and that portion of said pattern plate opposite thereto at any instant for controlling said moving means to cause said tracer plate to follow said edge contour and said tool to operate on the work in accordance therewith.

23. In combination, a work holder, a tool, a motor actuable to produce relative traversing motions between said holder and tool to cause said tool to traverse work held by said holder, a motor actuable to feed and retract said tool relative to the work, a tracer having a variable electrical characteristic, a pattern in operative relation to said tracer to cause variations in said electrical characteristic through variations between a portion of said tracer and said pattern, and means responsive to variations in said electrical characteristic to effect a relative control of said motors to cause said tracer to follow said pattern.

24. In combination, a work holder, a tool, means actuable to produce relative traversing motions between said holder and tool to cause said tool to traverse work held by said holder, means actuable to feed and retract said tool relative to the work, a tracer having a variable frequency tuning element, a pattern in operative relation to said tracer to cause variation in said tuning element through variations between a portion of said tracer and said pattern, and means responsive to variations in said tuning element to effect a relative control of said actuable means to cause said tracer to follow said pattern.

25. In combination, a work holder, a tool, a motor actuable to produce relative traversing motions between said holder and tool to cause said tool to traverse work held by said holder, a motor actuable to feed and retract said tool relative to the work, a tracer having a variable electrical capacity element, a pattern in operative relation to said tracer to cause variations in said capacity element through position variations between a portion of said tracer and said pattern, and means responsive to variations in said capacity to effect a relative controlling of said motors to cause said tracer to follow said pattern.

26. In combination, a work holder, a tool, a motor actuable to produce relative traversing motions between said holder and tool to cause said tool to traverse work held by said holder, a motor actuable to feed and retract said tool relative to the work, a tracer having a variable electrical characteristic, a pattern in operative relation to said tracer to cause variations in said electrical characteristic through variations between a portion of said tracer and said pattern, and means responsive to variations in said electrical characteristic to effect a relative control of said motors to cause said tracer to follow said pattern and with a correcting velocity dependent on the amount of such variation from a determined value.

27. In combination, a work holder, a tool, a motor actuable to produce relative traversing motions between said holder and tool to cause said tool to traverse work held by said holder, a motor actuable to feed and retract said tool relative to the work, a tracer having a variable electrical capacity element, a pattern in operative relation to said tracer to cause variations in said capacity element through position variations between a portion of said tracer and said pattern, and means responsive to variations in said capacity to effect a relative controlling of said motors to cause said tracer to follow said pattern and with a correcting velocity dependent on the amount of such variation from a determined value.

28. In combination, a work holder, a tool, a pattern, a tracer, means for traversing said tracer relative to said pattern and said tool relative to work on said work holder, means responsive to small variations transversely of said traverse between a portion of said tracer and said pattern, a circuit having a voltage controlled in amount by said responsive means, a motor for producing feed and retracting motions between said tracer and pattern and between said tool and work, and means controlled by the amount of said voltage for controlling the direction and rate of motion of said feed motor.

29. In combination, a work holder, a tool, a pattern, a tracer, means for traversing said tracer relative to said pattern and said tool relative to work on said work holder, means responsive to small variations transversely of said traverse between a portion of said tracer and said pattern, a circuit having a voltage controlled in amount by said responsive means, a motor for producing feed and retracting motions between said tracer and pattern and between said tool and work, and means controlled by the amount of said voltage for controlling the direction and rate of motion of said feed motor and the rate of motion of said traversing means.

30. In combination, a work holder, a tool, a pattern, a tracer, means for traversing said tracer relative to said pattern and said tool relative to work on said work holder, means responsive to small variations transversely of said traverse between a portion of said tracer and said pattern, a circuit having a voltage controlled in amount by said responsive means, a motor for producing feed and retracting motions between said tracer and pattern and between said tool and work, and means controlled by the amount of said voltage modified by the electromotive force of said feed motor for controlling the direction and rate of motion of said feed motor.

31. In combination, a work holder, a tool, a pattern, a tracer, means for traversing said tracer relative to said pattern and said tool relative to work on said work holder, means responsive to small variations transversely of said traverse between a portion of said tracer and said pattern, a circuit having its voltage controlled in amount by said responsive means, a motor for producing feed and retracting motions between said tracer and pattern and between said tool and work, and means controlled by the amount of said voltage modified by the electromotive force of said feed motor for controlling the direction and rate of motion of said feed motor and the rate of motion of said traversing means.

32. In combination, a work holder, a tool, a pattern, a tracer, a motor for traversing said tracer relative to said pattern and said tool relative to work on said holder, a motor for producing relative feed and retracting motions between said tool and work and between said tracer and pattern transverse to the direction of traverse, said tracer including a circuit tuning element responsive in tuning value to small position differences between a portion of said tracer and said pattern, an oscillatory circuit responsive in voltage to the tuning value of said element, means for rectifying said voltage, said feed motor having windings for driving the same in reverse directions, a source of alternating current, and a gas filled three-element power-control tube for each of said windings receiving its power from said source and having its grid biased by alternating voltage of the same frequency and in definite phase relation to that of said source and by said direct current voltage, said direct current voltage being connected in reversed relation to said tubes and acting with said biasing alternating current to bias said grids to pass currents to said feed motor to drive it in a correcting direction on departure of said tuning value in either direction from a predetermined value.

33. In combination, a work holder, a tool, a pattern, a tracer, a motor for traversing said tracer relative to said pattern and said tool relative to work on said holder, a motor for producing relative feed and retracting motions between said tool and work and between said tracer and pattern transverse to the direction of traverse, said tracer including an electrical condenser responsive in capacity to small position differences between a portion of said tracer and said pattern, an oscillatory circuit responsive in voltage to the capacity of said element, means for rectifying said voltage, said feed motor having windings for driving the same in reverse directions, a source of alternating current, and a gas filled three-element power-control tube for each of said windings receiving its power from said source and having its grid biased by alternating voltage of the same frequency and in definite phase relation to that of said source and by said direct current voltage, said direct current voltage being connected in reversed relation to said tubes and acting with said alternating current bias to bias said grids to pass currents to said feed motor to drive it in a correcting direction on departure of said capacity in either direction from a predetermined value.

34. In combination, a work holder, a tool, a pattern, a tracer, a motor for traversing said tracer relative to said pattern and said tool relative to work on said holder, a motor for producing relative feed and retracting motions between said tool and work and between said tracer and pattern transverse to the direction of traverse, said tracer including a circuit tuning element responsive in tuning value to small position differences between a portion of said tracer and said pattern, an oscillatory circuit responsive in voltage to the tuning value of said element, means for rectifying said voltage, said feed motor having windings for driving the same in reverse directions, a source of alternating current, and a gas filled three-element power-control tube for each of said windings receiving its power from said source and having its grid energized by alternating voltage of the same frequency and in definite phase relation to that of said source and by said direct current voltage and by the counter electromotive force of said feed motor, said direct current voltage being connected in reversed relation to said tubes and acting with said other biasing voltages to bias said grids to pass currents to said feed motor to drive it in a correcting direction on departure of said tuning value in either direction from a predetermined value.

35. In combination, a work holder, a tool, a pattern, a tracer, a motor for traversing said tracer relative to said pattern and said tool relative to work on said holder, a motor for producing relative feed and retracting motions between said tool and work and between said tracer and pattern transverse to the direction of traverse, said tracer including an electrical condenser responsive in capacity to small position differences between a portion of said tracer and said pattern, an oscillatory circuit responsive in voltage to the capacity of said element, means for rectifying said voltage, said feed motor having windings for driving the same in reverse directions, a source of alternating current, and a gas filled three-element power-control tube for each of said windings receiving its power from said source and having its grid energized by alternating voltage of the same frequency and in definite phase relation to that of said source and by said direct current voltage and by the counterelectromotive force of said feed motor, said direct current voltage being connected in reversed relation to said tubes and acting with said other biasing voltages to bias said grids to pass currents to said feed motor to drive it in a correcting direction on departure of said capacity in either direction from a predetermined value.

36. A mechanism comprising, in combination, a work holder, a pattern, a tracer, means for traversing said tracer relative to said pattern and said tool relative to work on said holder, means for producing relative feed and retracting motions between said tool and the work and between said tracer and said pattern respectively, said tracer including an element having a characteristic variable with small variations between a portion of said tracer and said pattern, means responsive to the variations of said characteristic from a predetermined value for actuating said feed means in a corrective direction, means acting at the end of a traverse in one direction to actuate said feeding means to withdraw said tracer and tool from said pattern and work respectively out of control of said element and to actuate said traversing means in the opposite direction, and means acting automatically at the end of said return traverse to stop and then reverse said traversing means and to return said feeding means to control by said element.

37. A mechanism comprising, in combination, a work holder, a pattern, a tracer, means for traversing said tracer relative to said pattern and said tool relative to work on said holder, means for producing relative feed and retracting motions between said tool and the work and between said tracer and said pattern respectively, said tracer including an element having a characteristic variable with small variations between a portion of said tracer and said pattern, means responsive to the variations of said characteristic from a predetermined value for actuating said feeding means in a corrective direction, means acting at the end of a traverse in one direction to actuate said feeding means to withdraw said tracer and tool from said pattern and work respectively out of control of said element, means for then relatively indexing said work and tool, and means for reestablishing control by the relative positions of said tracer and pattern of the work and tool during a return traverse.

38. A mechanism comprising, in combination, a work holder, a pattern, a tracer, a tool, means for traversing said tracer relative to said pattern and said tool relative to work on said holder, means for producing relative feed and retracting motions between said tool and the work and between said tracer and said pattern respectively, said tracer including an element having a characteristic variable with small variations between a portion of said tracer and said pattern, means responsive to the variations of said characteristic from a predetermined value for actuating said feeding means in a corrective direction, means acting at the end of a traverse in one direction to actuate said feeding means to withdraw said tracer and tool from said pattern and work respectively out of control of said element, means for then relatively indexing said pattern and tracer, and means for reestablishing control of the work and tool by the relative positions of said tracer and pattern during a return traverse.

39. A mechanism comprising, in combination, a tool, a work holder, a pattern, a tracer, means for traversing said tracer relative to said pattern and said tool relative to work on said holder, means for producing relative feed and retracting motions between said tool and the work and between said tracer and said pattern respectively, said tracer including an element having a characteristic variable with small variations between a portion of said tracer and said pattern, means responsive to the variations of said characteristic from a predetermined value for actuating said feeding means in a corrective direction, means acting at the end of a traverse in one direction to actuate said feeding means to withdraw said tracer and tool from said pattern and work, respectively, out of control of said element, means for then relatively indexing said pattern and tracer and said work and tool, respectively, and means for re-establishing control of the work and tool by the relative positions of said tracer and pattern during a return traverse.

40. A mechanism comprising, in combination, a work holder, a pattern, a tracer, a tool, means for traversing said tracer relative to said pattern and said tool relative to work on said holder, means for producing relative feed and retracting motions between said tool and the work and between said tracer and pattern respectively, said tracer including an element having a characteristic variable with small variations between a portion of said tracer and said pattern, means responsive to the variations of said characteristic from a predetermined value for actuating said feeding means in a corrective direction, means acting at the end of a traverse in one direction to actuate said feeding means to withdraw said tracer and tool from said pattern and work respectively out of control of said element, means for then relatively indexing said pattern and tracer, and means for re-establishing control of the work and tool by the relative positions of said tracer and pattern during a return traverse.

41. In combination, a work holder, a tool, a pattern, a tracer device movable across said pattern, means for producing an electrical potential responsive in amount to the relation between said pattern and a portion of said device and variable in accordance with small variations therebetween, and means responsive to said potential and to the extent of its departure from a predetermined value for relatively moving said pattern and said device at a rate proportional to the amount of such departure to minimize such variations and to cause said tool to operate on work carried by said holder in accordance with said pattern.

42. A mechanism comprising in combination, a work holder, a tool, a pattern, a tracer device for said pattern, a motor for relatively traversing said work holder and tool and said pattern and tracer respectively, a motor for producing relative feeding and retracting movement transversely of said traversing movements between said tool and work holder and between said pattern and tracer respectively, means for producing an electrical potential variable in accordance with variations between said pattern and a portion of said device, and a plurality of power controlling thermionic tubes biased by said potential for controlling said motors to cause said tracer device to follow the contour of said pattern and said tool to operate on the work in accordance therewith.

43. A mechanism comprising in combination, a work holder, a tool, a pattern, a tracer device for said pattern, a motor for relatively traversing said work holder and tool and said pattern and tracer respectively, a motor for producing relative feeding and retracting movement transversely of said traversing movements between said tool and work holder and between said pattern and tracer respectively, means for producing an electrical potential variable in accordance with variations between said pattern and a portion of said device, a plurality of power controlling thermionic tubes biased by said potential, and relays controlled by said tubes for controlling said motors to cause said tracer device to follow said pattern and said tool to operate on the work in accordance therewith.

44. A mechanism comprising in combination, a work holder, a tool, a pattern, a tracer device for said pattern, a motor for relatively traversing said work holder and tool and said pattern and tracer respectively, a motor for producing relative feeding and retracting movement transversely of said traversing movements between said tool and work holder and between said pattern and tracer respectively, means for producing an electrical potential variable in accordance with variations between said pattern and a portion of said device, a plurality of differentially biased thermionic tubes additionally biased by said potential to come into or go out of operation serially as said potential is increased or decreased, and relays controlled by said tubes for controlling said motors to cause said tracer device to follow said pattern and said tool to operate on work in accordance therewith.

45. A mechanism comprising a magnetic table, blocks arranged on said table with edge portions defining an edge contour, a tracer having a portion engageable with and movable along said edge portions, a tool, a work holder, and means controlled by movements of said tracer for relatively moving said tool and work holder and causing said tool to operate on work on said holder in accordance with said edge contour.

46. A mechanism of the class described, comprising a work holder, a tool holder, means for producing relative traversing movements of said holders, means for producing relative feed and retractive motions between said holders, and electrical means correlating the rates of motion of said motion-producing means for producing and controlling said motions.

47. In a machine of the class described, a work holder, a tool holder, an electric motor for producing relative traversing movements of said holders, an electric motor for producing relative feed and retractive motions between said holders, and motor control means having as one controlling factor in the control of one of said motors the voltage across the armature of the other of said motors.

48. In a machine of the class described, a work holder, a tool holder, means for producing relative traversing movements of said holders, means for producing relative feed and retractive movements between said holders, and controlling electrical mechanism for said movement producing means acting to decrease the rate of motion of one of said means as the rate of motion of the other of said means is increased.

49. In a machine of the class described, a work holder, a tool holder, a pair of means each imparting a relative movement between said holders, and electrical control mechanism for said means responsive in its control of one of said means to the rate of motion of the other of said means.

50. In combination, means supporting a pattern, a tracer support, a work support, a tool, means for moving said tool along the surface of work carried by said work support and said tracer support along said pattern, means for moving said tool and tracer support transversely of said first motion, a tracer yieldingly carried on said tracer support to follow the contour of such pattern during such traversing movement, and means responsive to a component of motion of said tracer in following said pattern in one rectilinear direction only relative to its support for controlling both of said moving means.

51. In combination, means supporting a pattern, a tracer support, a work support, a tool, means for traversing said tool along the surface of work carried by said work support and said tracer support along said pattern, means for moving said tool and tracer support transversely of said first motion to move said tool and tracer support in and out relative to the work and pattern, respectively, a tracer yieldingly carried on said tracer support to follow the contour of said pattern during such traversing movement, means responsive to the in and out movement of said tracer relative to its support in following said pattern to control said in and out moving means, and means responsive to the rate of such in and out movement of said tool and tracer support for controlling the rate of motion of said traversing means.

52. In a machine of the class described, a work holder, a tool holder, means for moving said holders relatively to cause a tool on said tool holder to operate on work on said work holder, and mechanism including high frequency electrical mechanisms for controlling said moving means.

53. In a machine of the class described, a work holder, a tool holder, pattern controlled means for moving said holders relatively to cause a tool on said tool holder to operate on work carried by said work holder, and means for introducing variable corrective factors in the action of said pattern-controlled means.

54. In a machine of the class described, a work holder, a tool holder, pattern controlled means for moving said holders relatively to cause a tool on said tool holder to operate on work carried by said work holder, and means responsive to variable inaccuracies in relative positions of tool and work for introducing corrective factors in the action of said pattern controlled means.

55. In a machine of the class described, a work holder, a tool holder, pattern controlled means for moving said holders relatively to cause a tool on said tool holder to operate on work carried by said work holder, and means responsive to flexure of the tool from normal position for introducing corrective factors in the action of said pattern-controlled means.

56. In a machine of the class described, a work holder, a tool holder, pattern-controlled means for moving said holders relatively to cause a tool on said tool holder to operate on work carried by said work holder, and means responsive to flexure of the work from normal position for introducing corrective factors in the action of said pattern-controlled means.

57. In a machine of the class described, a work holder, a tool holder, pattern-controlled means for moving said holders relatively to cause a tool on said tool holder to operate on work carried by said work holder, and means responsive to flexure of the tool and work from proper relative positions for introducing corrective factors in the action of said pattern-controlled means.

58. A follow-up system comprising a mechanism to be controlled, a controlling device provided with a controlling element and having an electrical characteristic variable with variations of said element from a predetermined condition, and means in electrical connection with said device responsive both in direction and amount to such characteristic variation from a value corresponding to such predetermined condition and controlling said mechanism and returning said element toward said condition at a rate depending on said amount.

59. A follow-up system comprising a mechanism to be controlled, a controlling device provided with a movable element and having an electrical characteristic continuously variable with motion of said element, and means in electrical connection with said device proportionately responsive to the variation of its said characteristic and controlling said mechanism in accordance with such variation and connected to move said element in a manner to return said characteristic toward a certain value on departures therefrom.

60. A follow-up system comprising a mechanism to be controlled, a controlling device provided with a variable electrical condenser, and means in electrical connection with said device controlling said mechanism and acting on said condenser to return its capacity toward a predetermined value on departures therefrom, said controlling means including means responsive to the amount of such departure and effective to regulate the speed of such control and return toward said predetermined capacity value in accordance with such amount.

61. A follow-up system comprising a mechanism to be controlled, a controlling device provided with a variable electrical condenser, electrical power means in electrical connection with said device controlling said mechanism and acting on said condenser to return its capacity toward a predetermined value on departures therefrom, said controlling means including apparatus for regulating the passage of electrical energy to said power means in accordance with the direction and the amount of such departure, and actuating apparatus operated by the energy so passed.

62. A follow-up system comprising a mechanism to be controlled, a controlling device provided with a variable electrical condenser, electrical power means in electrical connection with said device controlling said mechanism and acting on said condenser to return its capacity toward a predetermined value on departures therefrom, said controlling means including current flow regulating apparatus responsive to the direction and amount of such departure, and actuating apparatus responsive in speed to such current flow.

63. The method of control which comprises effecting movement of a control member from neutral position in accordance with the change of a condition, effecting a control in accordance with said movement and concurrently returning said control member toward neutral position, producing an effect varying as a function of the rate of return of said member to neutral position, and controlling the rate of return of said control member jointly in accordance with the magnitude of said effect and the distance of said control member from neutral position.

64. A control system comprising a control member movable from neutral position in accordance with the change in magnitude of a condition, a controlled means for effecting a control and returning said control member to neutral position, and means for controlling the speed of said controlled means including means responsive to the speed of return of said control member and to its distance from neutral position.

65. In a remote control for power motors, the combination with a reversible motor and current source, of means for controlling the direction of said motor and its speed during deceleration comprising an electron tube and a controlling signal therefor of varying magnitude and direction, a small generator driven by said motor, and means for impressing the output thereof to oppose said signal.

66. The method of restoring the balance of a normally balanced electrical system which comprises adjusting said system in response to an electrical unbalance thereof and in such a manner as to decrease the amount of electrical unbalance, while simultaneously further decreasing the amount of electrical unbalance of the system at the commencement of the adjustment and additionally an amount varying according to the rate of said adjustment until a balanced condition is re-established.

67. A positional control system comprising a Thyratron, means in the input system of said Thyratron for producing an alternating signal voltage on its grid, a controlled object, reversible motive means in the output system of said Thyratron energized upon firing of the Thyratron to change the position of said object to an extent determined by said signal voltage, and desensitizing means operative upon firing of the Thyratron to derive a direct-current negative biasing potential applied to said grid.

68. In a remote control for power motors, the combination with a reversible motor and current source, of means for controlling the direction of said motor and its speed during deceleration, comprising an electron tube and a controlling signal therefor of varying magnitude and direction, a winding in said motor developing a voltage responsive to the speed of said motor, and means for impressing the output of said winding to oppose said signal.

69. In a remote control for power motors, the combination with a reversible motor and current source, of means for controlling the direction of said motor and its speed during deceleration, comprising an electron tube having a grid circuit, a controlling signal therefor of varying magnitude and direction, means for impressing said controlling signal on said grid circuit, a winding in said motor developing a voltage responsive to the speed of said motor, and means for impressing the output of said winding on said grid circuit to decrease the effect of said signal.

70. A positional control system comprising a Thyratron, means in the input system of said Thyratron for producing an alternating signal voltage on its grid, a controlled object, reversible motive means in the output system of said Thyratron energized upon the firing of the Thyratron to change the position of said object to an extent determined by said signal voltage, and desensitizing means comprising an impedance in the output system of said Thyratron effectively connected to the input system of said Thyratron to derive a direct current negative biasing potential applied to said grid operative upon firing of the Thyratron.

71. A positional control system comprising a Thyratron, means in the input system of said Thyratron for producing a signal voltage on its grid, a controlled object, a reversible motor connected in the output system of said Thyratron energized upon firing of the Thyratron to change the position of said object to an extent determined by said signal voltage, and desensitizing means comprising means for impressing in the input system of the Thyratron the voltage developed across a winding of said motor immediately upon firing of the Thyratron to derive a direct current negative biasing potential on said grid.

72. Apparatus for restoring the balance of a normally balanced electrical system, comprising, in combination, means responsive to the electrical unbalance of said system, means for adjusting said system to reduce the unbalance thereof, means actuated by said responsive means for operating said adjusting means to decrease the amount of unbalance, means operative immediately upon operation of said responsive means to decrease the amount of electrical unbalance of said system at the commencement of the adjustment, and means responsive to the rate of operation of said adjustment means for additionally decreasing the amount of unbalance until a balanced condition is re-established.

73. Apparatus for restoring the balance of a normally balanced electrical system, comprising, in combination, electronic means having an input circuit connected to said electrical system and responsive to the electrical unbalance of said system, impedance means for adjusting said system to reduce the unbalance thereof, motor means actuated by said electronic means for adjusting said impedance means to decrease the amount of electrical unbalance of said system, and a winding in said motor means connected to the input of said electronic means and operative immediately upon operation of said electronic means to decrease the amount of electrical unbalance at the commencement of adjustment, said winding developing a voltage responsive to the speed of said motor for additionally decreasing the amount of unbalance in proportion to the rate of operation of said adjustment until a balanced condition is re-established.

74. A control system comprising a control member movable from neutral position in accordance with the change in magnitude of a condition, a controlled means for effecting a control and returning said control member to neutral position, means forming an integral part of said controlled means for developing a control effect proportional to the speed of return of said control member, and means for controlling the speed of said controlled means jointly in accordance with the control effect developed by said speed responsive means and the distance of said control member from neutral position.

75. A control system comprising a control member movable from a neutral position in accordance with the change in magnitude of a condition, motor means for effecting a return of said control member to neutral position and having an integral portion thereof which develops a first control effect proportional to the speed of operation of said motor means, means developing a second control effect proportional to the distance of said control member from neutral position, and means for controlling the speed of said motor means including means jointly responsive to said first and second control effects.

ALBERT ALLEN.